United States Patent
Plimpton et al.

(10) Patent No.: US 7,281,382 B2
(45) Date of Patent: Oct. 16, 2007

(54) METHOD AND APPARATUS FOR DETECTING THE PRESENCE OF FLAME IN THE EXHAUST PATH OF A GAS TURBINE ENGINE

(75) Inventors: Jonathon Plimpton, Canterbury, NH (US); Leo Jubinville, Goffstown, NH (US); Edward Duckless, Derry, NH (US)

(73) Assignee: Vibro-Meter, Inc., Londonderry, NH (US)

( * ) Notice: Subject to any disclaimer, the term of this patent is extended or adjusted under 35 U.S.C. 154(b) by 183 days.

(21) Appl. No.: 10/516,788

(22) PCT Filed: Jun. 3, 2003

(86) PCT No.: PCT/US03/17040

§ 371 (c)(1),
(2), (4) Date: Dec. 3, 2004

(87) PCT Pub. No.: WO03/102494

PCT Pub. Date: Dec. 11, 2003

(65) Prior Publication Data

US 2006/0059917 A1  Mar. 23, 2006

Related U.S. Application Data

(60) Provisional application No. 60/388,604, filed on Jun. 3, 2002.

(51) Int. Cl.
 *F02C 7/00* (2006.01)
(52) U.S. Cl. .................. 60/779; 60/39.091; 60/803
(58) Field of Classification Search ............. 60/39.091, 60/734, 772, 779, 803
See application file for complete search history.

(56) References Cited

U.S. PATENT DOCUMENTS

| | | | | |
|---|---|---|---|---|
| 5,164,600 A | * | 11/1992 | Das et al. ................. | 250/554 |
| 5,828,797 A | * | 10/1998 | Minott et al. .............. | 385/12 |
| 6,078,050 A | * | 6/2000 | Castleman ............. | 250/339.15 |

* cited by examiner

*Primary Examiner*—L. J. Casaregola
(74) *Attorney, Agent, or Firm*—Sheehan, Phinney, Bass & Green; Peter A. Nieves

(57) ABSTRACT

A method and apparatus for monitoring the exhaust path of a gas turbine engine for the presence of unwanted flames downstream from the main combustion chamber(s). The system is comprised of an Electro-Optics Module containing sensors and associated processing electronics as well as collection and transmitting optics, which relay the radiant energy generated by a flame event to the sensors. The information generated by the sensors is directly related to the time based intensity of the flame event, which can suggest problems associated with the condition of combustion related engine components. This information can then be used by the engine owner/operator to assess the condition of the engine and determine the more efficient required maintenance schedule.

18 Claims, 25 Drawing Sheets

| NOZZLE | FLOW RATE LB/HR | SPRAY ANGLE (DEG.) | REMARKS | CONDITION |
|---|---|---|---|---|
| IDEAL | 28-31 | 78-88 | | CLEAN |
| A | 31 | 77 | | PARTIAL |
| B | 31 | 81 | | CLEAN |
| C | 31 | 77 | GOOD FLOW | PARTIAL |
| D | - | - | BAD THREADS | UNKNOWN |
| E | 31 | 87 | GOOD | CLEAN |
| F | 0 | 0 | PILOT CLOGGED | FULL |

FIG. 10

| TEST RUN | NOZZLE CONDITION (DEGREE OF CLOGGING) | | | | | | COMBINED SEVERITY | FLAME OBSERVATION |
|---|---|---|---|---|---|---|---|---|
| | NOZZLE 1 | NOZZLE 2 | NOZZLE 3 | NOZZLE 4 | NOZZLE 5 | NOZZLE 6 | | |
| 2 | CLEAN | CLEAN | CLEAN | CLEAN | CLEAN | CLEAN | 1 | NONE |
| 3 | CLEAN | CLEAN | CLEAN | CLEAN | CLEAN | CLEAN | 1 | NONE |
| 4 | CLEAN | CLEAN | PARTIAL | CLEAN | CLEAN | PARTIAL | 2 | SMALL |
| 5 | CLEAN | CLEAN | PARTIAL | CLEAN | CLEAN | PARTIAL | 2 | NONE |
| 6 | CLEAN | UNKNOWN | PARTIAL | CLEAN | PARTIAL | PARTIAL | 3 | NONE |
| 7 | CLEAN | UNKNOWN | PARTIAL | CLEAN | PARTIAL | PARTIAL | 3 | NONE |
| 8 | CLEAN | UNKNOWN | CLEAN | CLEAN | PARTIAL | PARTIAL | 2 | SMALL |
| 9 | CLEAN | UNKNOWN | CLEAN | CLEAN | PARTIAL | PARTIAL | 2 | SMALL |
| 10 | CLEAN | UNKNOWN | CLEAN | CLEAN | PARTIAL | FULL | 4 | LARGE |
| 11 | CLEAN | UNKNOWN | CLEAN | CLEAN | PARTIAL | FULL | 4 | SMALL |
| 12 | CLEAN | UNKNOWN | CLEAN | CLEAN | PARTIAL | FULL | 4 | LARGE |
| 13 | CLEAN | UNKNOWN | CLEAN | CLEAN | PARTIAL | PARTIAL | 4 | MEDIUM |
| 14 | CLEAN | UNKNOWN | CLEAN | CLEAN | PARTIAL | PARTIAL | 2 | MEDIUM |
| 15 | CLEAN | UNKNOWN | PARTIAL | CLEAN | PARTIAL | PARTIAL | 3 | MEDIUM |
| 16 | CLEAN | CLEAN | PARTIAL | CLEAN | CLEAN | PARTIAL | 2 | NONE |
| 17 | CLEAN | CLEAN | CLEAN | CLEAN | CLEAN | CLEAN | 1 | NONE |

FIG. 11

METHOD AND APPARATUS FOR DETECTING THE PRESENCE OF FLAME IN THE EXHAUST PATH OF A GAS TURBINE ENGINE

CROSS-REFERENCE TO RELATED APPLICATIONS

This application claims the benefit of U.S. Provisional Application No. 60/388,604, filed Jun. 3, 2002, the contents of which are incorporated in their entirety. The application claims benefit to PCT/US03/17040 filed Jun. 3, 2003, which is incorporated herein by reference in its entirety.

FIELD OF THE INVENTION

This invention relates to flame detection, and especially to a solid state, fiber optic linked flame sensor that is particularly useful in connection with sensing the flame in a gas turbine exhaust path as a means of determining the condition of the fuel nozzle(s).

BACKGROUND OF THE INVENTION

The life cycle cost reduction for capital equipment such as gas turbines is of great importance to end users such as the Navy, the shipping industries and power generation stations to name a few. Regular maintenance of gas turbine equipment by the operators is necessary to maximize performance and fuel efficiency however the associated increased maintenance costs offset the benefits of shorter maintenance intervals. Achieving the optimal maintenance plan, which minimizes the total operation and maintenance costs, depends on the availability of accurate performance degradation assessments from diagnostic and prognostic technologies.

These maintenance-timing decisions were historically founded on rigid schedules based upon hours of use or when the operator noticed a severe degradation in the performance or efficiency of the turbine. The maintenance-timing was determined from examining the various turbine components during normally scheduled maintenance or through mechanical failure and estimating whether the average turbine should be maintained in a shorter or longer interval to maximize efficiency and minimize maintenance costs. The shortfall of this method was that the maintenance schedule was based on the average condition of a fleet of given turbine types, where unnecessary maintenance was done on some turbines where needed maintenance was forgone on other turbines resulting in poor performance or worse, catastrophic failure and overall added costs. In some turbines, when an injector or injectors were sufficiently clogged, the combustion process is uncontrolled and can cause visible flash of flame in the exhaust. This is hard to determine without specific diagnostic equipment that has been historically a thermocouple. The problem is that once the degradation was significant enough for the operator to perform out of schedule maintenance excessive fuel was wasted or worse was that fouling of the fuel nozzle caused harm to the turbine because of the shortfalls of the prior art diagnostic equipment.

Specifically, fuel nozzle fouling, can cause "hot starts" where uncontrollable ignition results in flame propagation through the turbine and damage to hot section components which necessitates expensive repairs and removing the affected turbine from service.

The Allison 501 turbine engine is used frequently in the Navy for shipboard power generation. The fuel nozzles in the Allison 501 engine often become clogged with internal or external carbon deposits. Fouling typically affects the pilot injection port more severely than the main port. The pilot port is used during engine startup and idle when the fuel flow rate is too low for proper atomization by the main port. A pressure-driven flow divider directs the flow to the appropriate port for proper atomization of the fuel for operation.

The fuel spray pattern is adversely affected by clogging and can lead to flame position problems that burn hot section components, and increases potentially damaging "hot starts" or "no starts". Clogged injectors can delay ignition ("light-off") during engine start-up and cause a buildup of fuel in the combustor. When ignition finally occurs, the unusually rich fuel/air mixture can cause excessive gas temperatures, temperature gradients and pressure gradients that damage hot section components. The excess fuel often produces a flash of flame in the engine's exhaust as well that may be detected visually.

DESCRIPTION OF THE KNOWN PRIOR ART

Earlier flame detection systems which have been used to monitor various gas turbine combustion processes include thermocouples, gaseous discharge ultraviolet detectors, and, more recently, silicon carbide (SiC) ultraviolet detectors. Thermocouples have been used in the combustion chamber area as well as in the exhaust gas stream. The problem of the thermocouple prior art in addition to having too slow of a response time to adequately sense flame, thermocouples do not last for long periods in the highly oxidizing atmosphere of a gas turbine.

Gaseous Discharge UV detectors have traditionally been used to validate the proper ignition of the combustion flame. They are extremely fast devices with a wide operating temperature range. When properly constructed they are non-responsive to the radiant energy of hot surfaces in the combustion chamber. Their drawbacks are in many ways related only to industry perception. More specifically, they are considered by most to be antiquated technology. Additionally they suffer from requiring supply voltages in excess of 325 volts DC. Silicon carbide UV sensors are considered by most to be the modern replacement for the Gaseous Discharge UV detectors.

Turbine manufacturers and users are not presently known to be making use of any optical means to alert them to the presence of a flame in the exhaust section of their engines. Rather, they are utilizing thermocouple arrays to profile the temperatures in various locations throughout the exhaust path stream. The time durations of the flame events observed during our testing were so short (in the realm of a second or less), that thermocouple technology would not be responsive enough to accurately detect them. Therefore the improvement in reducing unnecessary maintenance costs is minimal and not cost effective using a thermocouple because of the shortfalls consistent with that method of monitoring flame in the exhaust section of the turbine.

OBJECTS OF THE INVENTION

Accordingly, it is an object of the instant invention to provide a method of determining the condition of the nozzle fouling to maximize fuel efficiency.

It is an object of the present invention to detect the presence of a flame, as it exists in the exhaust path of a gas turbine engine.

It is a further objective to be able to delineate differences in the intensity and duration of flame presence in the exhaust stream of a gas turbine engine.

It is yet another objective to be able to assign a measure of nozzle fouling (coking) certainty as a result of the analysis of the signal generated by the electronics of the optical monitoring equipment.

It is a continued object of this invention to serve in a feed back role to a centralized control system acting in the capacity of a Conditioned Based Monitor, for equipment operation maintenance.

SUMMARY OF THE INVENTION

The present invention achieves the above-described objectives by providing an Electro-Optics Module (EOM), Fiber Optic Cable Assembly and an Optical Viewing Port or alternatively a sensor directly mounted that produces a signal in the presence of a flame directly attached to the exhaust port. The EOM houses the sensor(s) and signal processing electronics. The Optical View Port mounts to the gas turbine engine preferably down stream from the combustion chamber(s) and collects the radiant energy from the flame and focuses it on the tip of the Fiber Optic Cable Assembly. The Fiber Optic Cable Assembly transmits the radiant energy collected by the Optical View Port to the sensor(s) located inside the EOM.

The sensor(s) may optionally be assembled in modules containing optional custom discrete optical filters and amplification circuitry. The optical filters guarantee that the spectral energy reaching the sensor elements is restricted to wavelengths specific to the signatures of the flame source, however any sensors respondent to unfiltered energy within the visible light spectrum would satisfy the inventions requirements.

The sensor analog signals, which are proportional to the intensity of the radiant energy received, are optionally recorded either on a physical chart or indicator, or preferably converted to digital signals and fed into the EOM's microprocessor where they are compared using the Meggitt developed algorithms. The result of the processed signal is a determination of flame signal intensity and its duration. These time and date stamped signal traits are stored within the EOM's self-contained memory for later evaluation. Additionally these signals are available to be fed to the Condition Based Monitoring data collection center for the engine.

BRIEF DESCRIPTION OF THE DRAWING

FIG. 10 is a table with test fuel nozzles and their known performance characteristics.

FIG. 11 is a table showing resulting flame presence in the exhaust section of a gas turbine in relation to the condition of the fuel nozzle.

DETAILED DESCRIPTION

Figure 8:
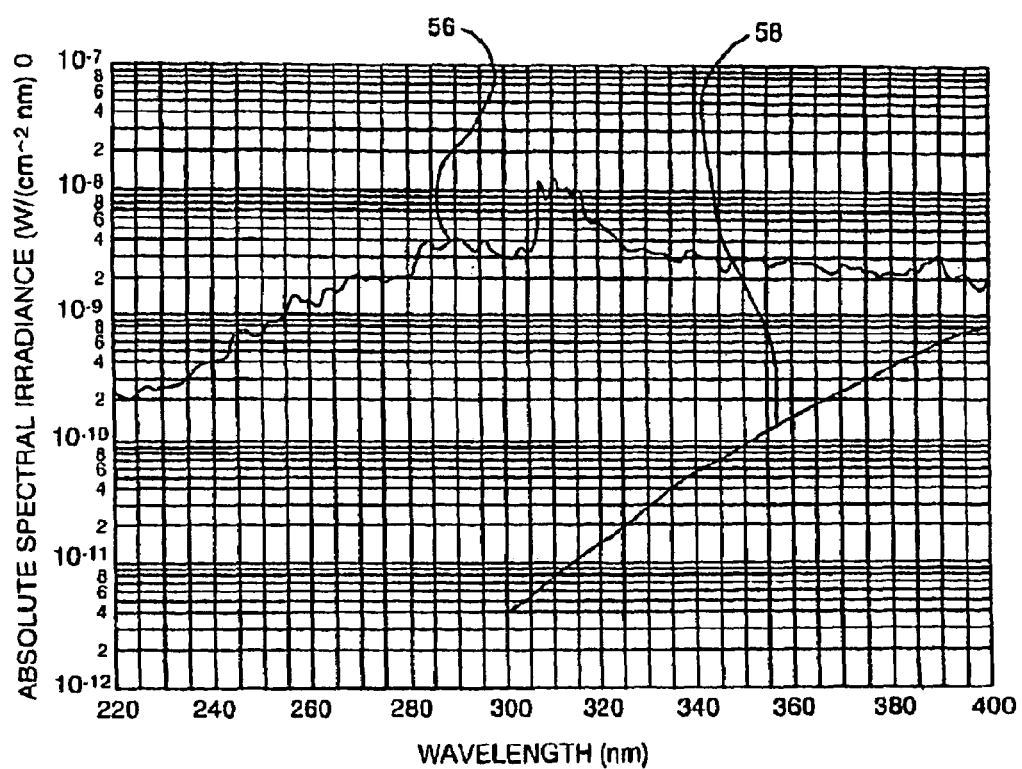
FIG. 8 is a plot showing the spectral irradiance differences between a bench-top propane Bunsen burner source and a 1900° K. graybody in the ultraviolet region.

In reference to FIGS. 1–5, according to one potential embodiment of the present invention is at least one fiber optic flame sensor 10 for monitoring the presence and/or intensity of the flame in the exhaust section of a gas turbine engine generally consists of three component sections; a high temperature probe or optical viewing port 20, at least one fiber optic cable 30, and an Electro-Optics Module 40 (E.O.M.). As described in detail below, the high temperature probe/optical viewing port 20, mounts directly on the engine in a location, which will provide an adequate view into the exhaust portion of the turbine thus acting as a sight pipe. The fiber optic cable 30 transfers the radiant electromagnetic energy emitted by an uncontrolled combustion flame from the viewing port 20 to the E.O.M. 40. The E.O.M. 40 preferably contains solid-state electronics for converting a selected wavelength region of the radiant electromagnetic energy to an electrical signal that is monitored, in a known manner, to determine the presence or absence of the undesirable flame in the exhaust plenum. The electrical signal thus indicates the presence of a flame, or absence of flame depending on the setup of the equipment. Furthermore, the monitoring can include the gathering of additional information about the flame condition such as intensity and duration of the event. In FIG. 8 it displays the difference between a bench-top propane Bunsen burner flame 56 and a 1900° K. greybody 58. The difference is clearly discernable to an accurate sensor calibrated to a flame radiation source.

The E.O.M. 40 could optionally use an analog method such as a simple visual indicator such as an indicator light or a paper chart that would serve as a record of the event of flash in the exhaust that has a very short duration. Or the signal can be converted to a digital signal for further processing by a digital computer. An example of an optical view port and fiber optic linked cable assembly suitable for use are further described in U.S. Pat. No. 5,828,797 entitled "Fiber Optic Linked Flame Sensor", the contents of which are herein incorporated by reference in their entirety. Several concepts related to the monitoring of a flame are disclosed in U.S. Pat. No. 6,071,114 entitled "Method and Apparatus For Characterizing a Combustion Flame", which is also incorporated by reference in its entirety.

Figure 1:
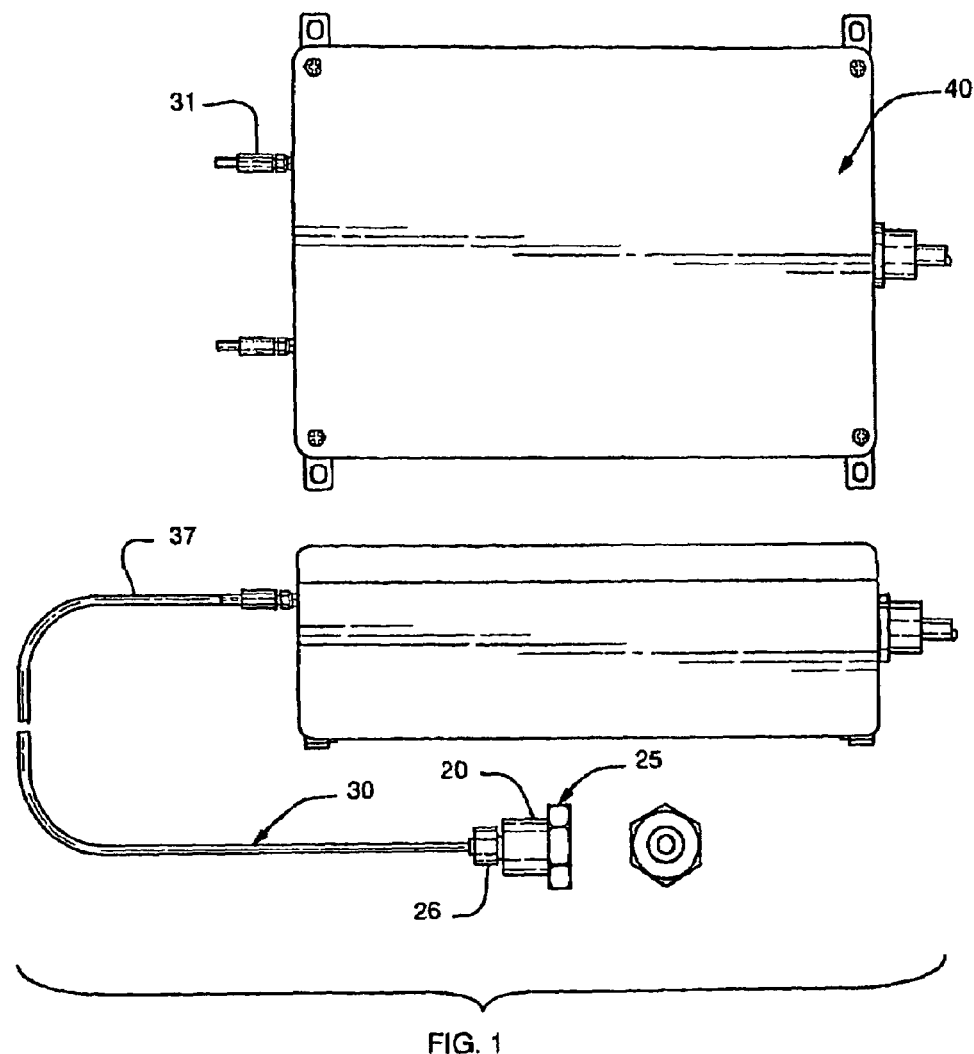
FIG. 1 is a plan view of a fiber optic linked flame sensor.
Figure 2:
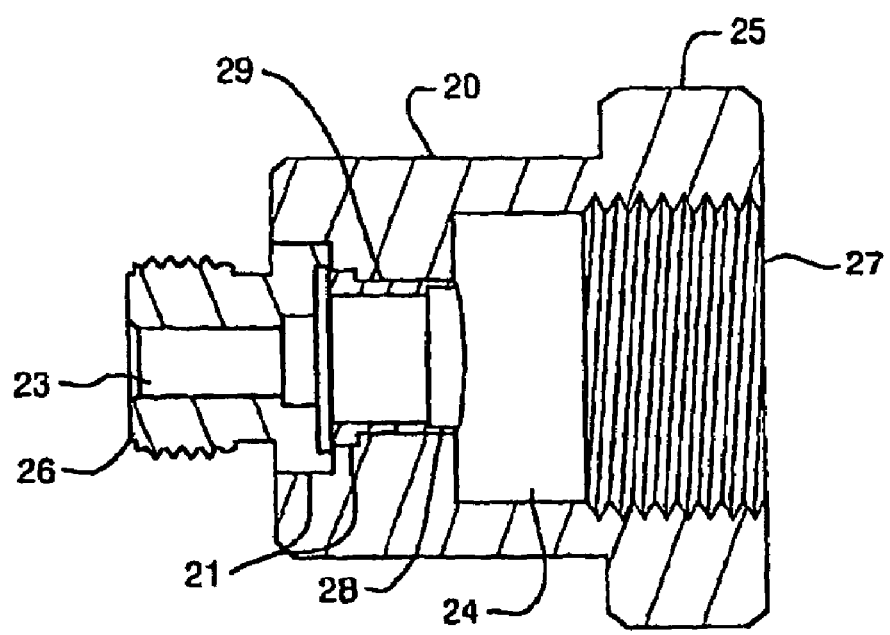
FIG. 2 is a partial side view of an optical probe.

Turning now to FIG. 2, the optical viewing port 20 is constructed of high temperature materials that can withstand the intense temperatures associated with the exhaust gasses. Preferably, the end portion 25 of the port 20, which mounts to the exhaust section may be constructed of either 316L stainless steel or Hastelloy X due to its corrosion resistant nature at elevated temperatures and in marine environments. The end portion 25 of port 20 mounts to the exhaust of the turbine preferably using threads 27, that are ¾ NPT mounting threads. Threads 27 can be replaced with welding, riveting, quick disconnect or various other methods of fastening known in the art. It is preferable that the fitting be standardized and provide a good seal to avoid escape of turbine exhaust gasses. A thread fit is therefore preferable because it is inexpensive and effective at tightly connecting and sealing the probe to the exhaust while allowing for ease of removal.

Additionally, other materials with similar minimum performance characteristics can be utilized in other possible probe configurations and material combinations to provide the needed site pipe into the exhaust chamber of probe/port 20.

In particular, it is important that whatever material is used in the construction of the optical view port probe, it must not impart undue strain to the Kovar ring 29 containing the brazed sapphire window 28. The port 20 acts as a sight pipe into the exhaust section and may contain a braze-sealed sapphire lens 28. The instant invention only requires that the port 20 act as a minimum as a sight pipe and therefore it is anticipated that many substitutes may be fashioned as long as it has the capacity to withstand the heat of the turbine exhaust and simultaneously transmit the spectral radiation from the flame in the exhaust path to the E.O.M. 40, or it can be replaced with a sensor assembly capable of directly monitoring the presence of flame. The end portion 25 of port 20 mounts to the gas turbine's exterior exhaust housing, preferably positioned as close to the beginning of the exhaust section as feasible ensuring that the Radiant energy is transferred from any flame present in the exhaust into the sight tube bore 24 of the probe 20 through opening 23, and then to the fiber optic cable interface 26 into the fiber optic cable 30. The Radiant energy is potentially, but not limited to all light/energy produced within the spectral range of 200 nm to 800 nm, but preferably it is the frequency associated with the presence of a flame; this would obviously include all the electromagnetic frequencies in the infrared associated with the by products of hydrocarbon combustion such as $H_2O$ and $CO_2$.

In one embodiment, the probe 20 has an overall length of about 2.2∀, and the sight tube opening 24 containing ¾-14 NPT threads and a lens aperture of approximately 0.48∀, these dimensions are not critical and can be changed based on matching the physical parameters of the least expensive components produced at the time of manufacture and the physical requirements as they relate to efficient access to the exhaust stream.

The probe 20 dimensions are not critical as long as it functions to efficiently couple the radiant energy from exhaust of the gas turbine to the optical cable 30. The optical cable 30 can potentially be eliminated if the E.O.M. 40 is sufficiently dimensioned to fit directly upon probe 20 and heat resistant enough to survive close proximity to the exhaust environment of the gas turbine or a flame sensor 10 (direct mounting of the flame sensor to exhaust not displayed) is of sufficient construction and cost effective to be directly mounted to the exhaust portion of the turbine.

The sapphire lens 28 is braze-sealed to a Kovar ring 29, which then is then welded 21 into the probe body 20. The sapphire lens seal is preferred because it is capable of withstanding gas temperatures of 900 degree F. at pressures reaching 500 psi, but other materials can be substituted having suitable characteristics for the monitoring environment. This lens 28, therefore, acts as the protective barrier separating the combustion process from the other optical system components. The sapphire lens 28, Plano convex in the preferred configuration, focuses the radiant emission energy resultant from the combustion process into the suitable acceptance angle matching the numerical aperture of the fiber optic cable 30, the tip of which is inserted into cable interface 26. The interior walls of Kovar ring 29 of the brazed lens assembly welded within the sight probe are optionally plated with gold or other suitable materials to help prevent oxidative contaminants from fouling the optical surfaces.

The fiber optic cable 30 transfers the radiant energy projected through the high temperature probe lens 28, from the errant flame potentially present in the exhaust stream to the (E.O.M.) Electro-Optics Module 40.

Figure 3:
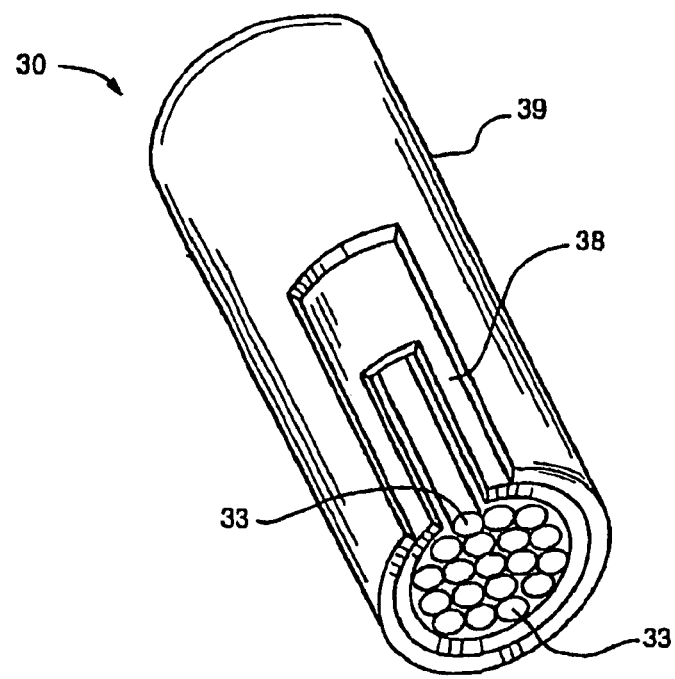
FIG. 3 is a partial cut-away view of a fiber optic cable.

Referring to FIG. 3, the fiber optic cable 30 contains at least one optical fiber 33 and may be composed of a plurality of individual fused silica optical fibers 33, and is preferably as short as possible in length to minimize losses but distances of about twenty feet or more in length are possible. Other materials that provide the necessary light transmissibility such as polymers may be substituted if they are capable of long-term use in the environment of the turbine.

Figure 4:
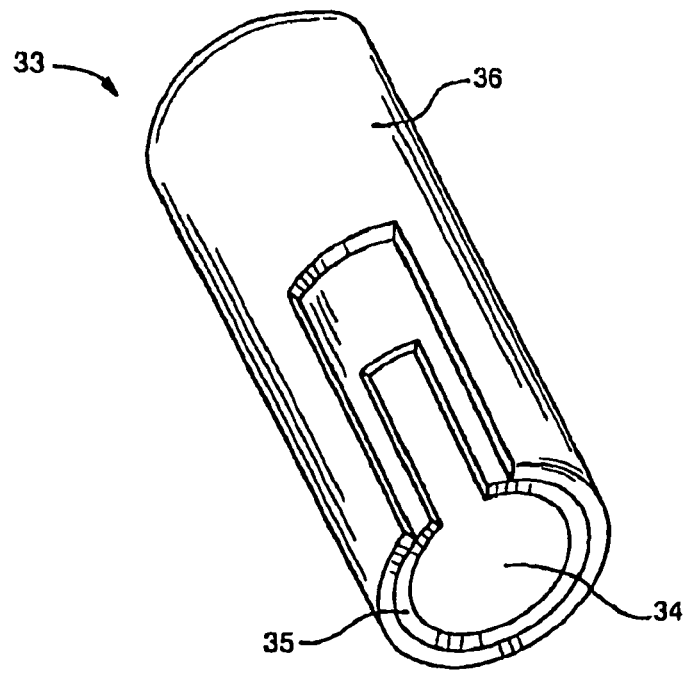
FIG. 4 is a partial cut away view of an individual fiber.

As shown in FIG. 4, in one embodiment an optical fiber 33 has a core 34 that has a low transmission loss, typically used is a pure fused silica that is preferably 200 micrometers (microns) in diameter or other materials such as polymers that offer sufficient transmission of energy over the desired cable length.

Optionally, if required for sufficient energy transmission for longer selected cables, over the core 34 is a cladding 35 composed of doped fused silica 10 microns thick. A buffer layer 36 of either polyimide or gold covers the cladding 35 in a thickness of about 5–15 microns, preferably 10 microns. In the first few inches, preferably about six to twelve inches, of the fiber optic cable at the high temperature probe end 37 (FIG. 1) of the cable; a gold buffer layer 36 rated at 900 degree F. is used. The remainder of the cable is provided with a polyimide buffer 36, rated at 540 degree F.

A more cost effective cable construction can be designed that eliminates some or all of the above described features. The cable is limited in its design only in that it must provide sufficient transmission of radiant energy to the sensor(s) and capable of withstanding the environment in which it is routed either in a high or preferably that of low heat environment to reduce expenses. It would be an obvious modification to one skilled in the art to design more or less features into the cable to save expense or to design for a less heat intensive environment.

As shown in FIG. 3, one potential configuration of the group of a plurality of fibers 33 is closely packed in a hexagonal arrangement and sheathed in fiber glass cloth 38 and a stainless steel braid 39. The ends of the cable 37 that are terminated in stainless steel ferrules 31 (FIG. 1) of a proper shape and size to interface with the high temperature probe 20 on one end, and the E.O.M. 40 on the other end. The minimum amount of fibers needed to transfer the radiant energy to the sensor is one, but additional fibers may be added for use with additional sensors or for redundancy purposes.

Figure 5:
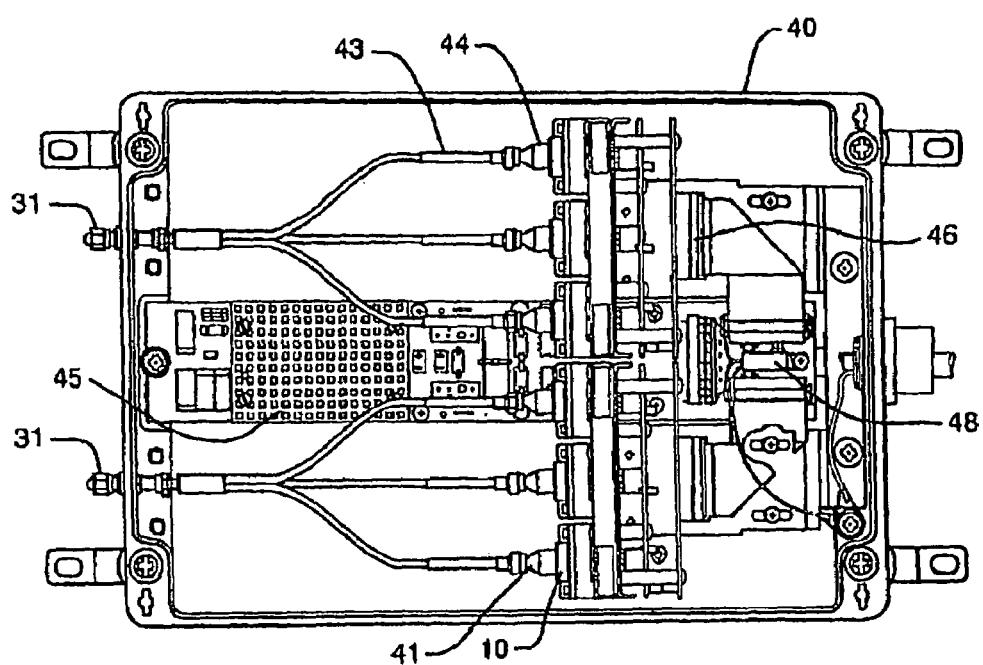
FIG. 5 is a view in a schematic form of an electro-optics module.

Turning to FIG. 5, the Electro Optics Module 40 (E.O.M.) is preferably located at the so-called low temperature end of the fiber optic cable 37. The ambient temperature where the E.O.M. is located is preferably no greater than 125 degree C., thus permitting conventional, low cost electronics to be used in the E.O.M. 40. The function of the E.O.M. 40 is to convert the radiant energy transmitted from a flame through the fiber optic cable 30 into an electrical output signal. To accomplish this, the tip 41 of the low temperature end 37 of the fiber optic cable 30 directs electromagnetic radiation with the aid of focusing optics 43 onto the active area of a solid state sensor 44 mounted optionally on a circuit board 45. Input and output to the circuit board is provided through a port 46 on the E.O.M. 40. The port 46 is preferably connected to a recordation device 48. On the occurrence of a flame-condition in the exhaust path, the radiant energy at the sensor 44 causes the E.O.M. 40 to provide an electrical signal, in a known manner, to the memory storage apparatus 48, either digital or analog indicating potential nozzle fouling to the operator or control electronics of the turbine.

One potential choice for solid-state sensor 44 is a Silicon Photodiode that is sensitive to the presence of a flame, which is usually filtered to monitor only the spectral range of a flame. This detector (BPW 21) is produced by OSRAM Opto Semiconductors that are available in TO-5 transistor cans. Other types of sensors may be substituted provided that they respond to at least a portion of the radiant energy produced from the flame in the wavelength range of 200 nm to 900 nm. The sensor 44 may be part of an optional transimpedance amplifier circuit 47 that generates a voltage output signal proportional to the intensity level of the radiation received within a specific spectral bandwidth. In addition to containing the sensor 44 and amplification electronics 47, the E.O.M. also may optionally contain processing electronics 49, depending on a user's requirements.

Figure 6:
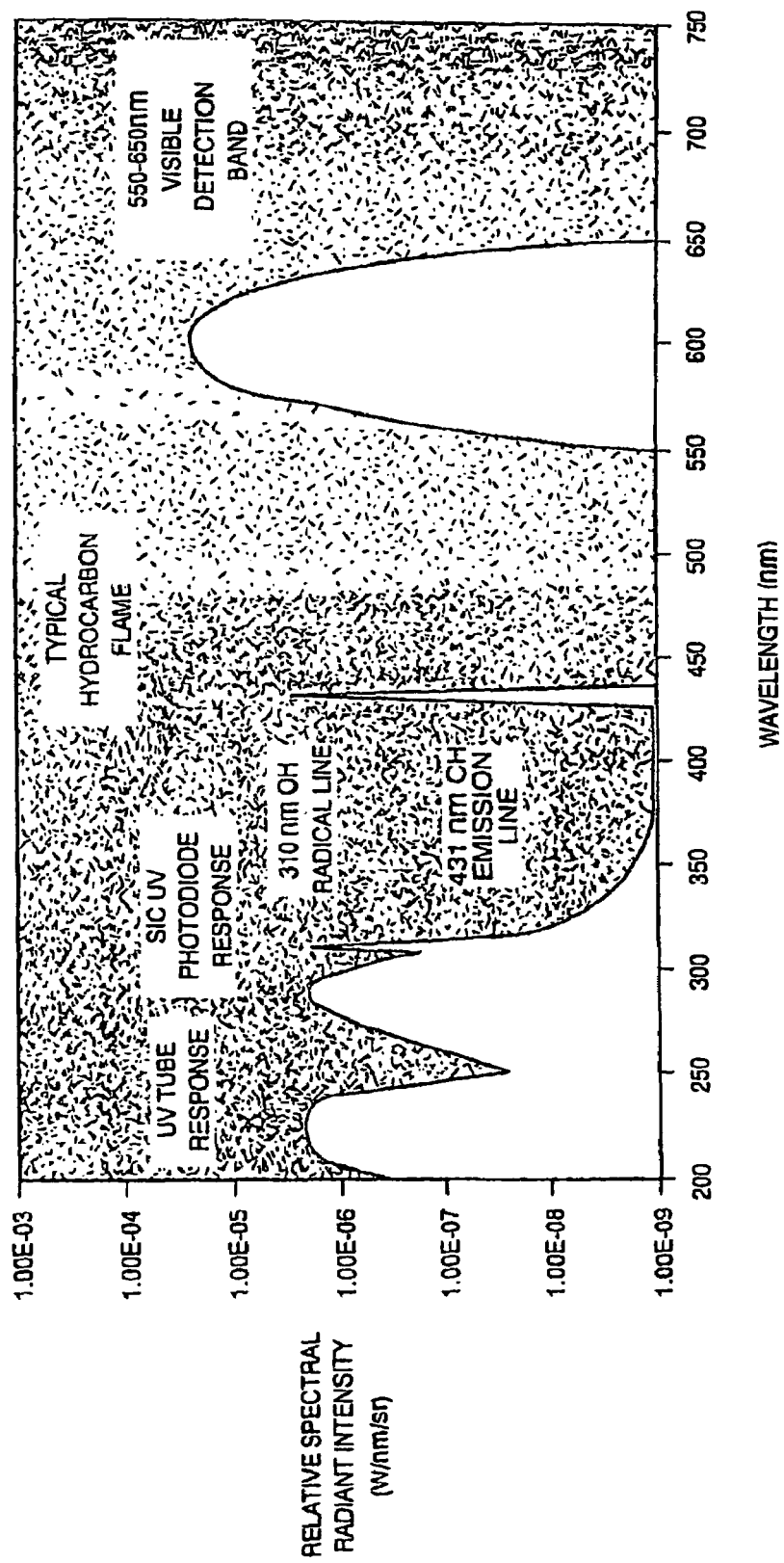
FIG. 6 is a theoretical plot of the relative spectral signature of a burning hydrocarbon fuel together with specific emission bands and various sensor detection regions.

In FIG. 6 a chart displays a spectrum of 200 to 750 nm and the relative spectral signature of a burning hydrocarbon and various sensor detection regions. Alternative detectors that can be selected are constructed using wavelength selecting sensing elements such as SiC (200–375 nm), GaN (200–365 nm), AlGaN (200–320 nm), and a relatively new UV photodiode having a spectral response range from 215 to 387 nm. This UV photodiode is based on semiconductor technology whereby a thin film deposition via the sol-gel process on the semiconductor determines its spectral properties. All of these detector types are available through Boston Electronics Corporation, Brookline Mass.

Although hydrocarbon flames are know to have a significant emission peak at 310 nm, the data acquired during testing would seem to indicate that there may not be enough radiant energy present in the exhaust path flame to excite these types of detectors without additional components to increase signal intensity. It is not to say that if mounted in a different location on the engine, however, that they would not work sufficiently well.

In an alternative method using these types of detectors, the selective spectral response could be considered advantageous. This would be the case in an application where the exhaust plenum may have many openings where ambient visible light may result in a false flame event. These events could occur if the viewing probe were to collect the energy produced by reflected sunlight or high intensity inspection lighting equipment. During the testing associated with this instant invention, there were no adverse effects realized with the ambient lighting present in the turbine package. More specifics as they relate to flame sensing with detectors such as those similar in nature to SiC UV detectors can be found in U.S. Pat. No. 5,828,797 and is incorporated in its entirety.

Alternative detectors having a spectral response from 200 nanometers (nm) to approximately 375 nm include, Gallium Nitride (GaN) UV detector available from APA Optics, Inc., Minneapolis, Minn., and Silicon-on-Insulator technology based UV photodiodes available from Spire Corporation, Bedford, Mass.

Figure 7:
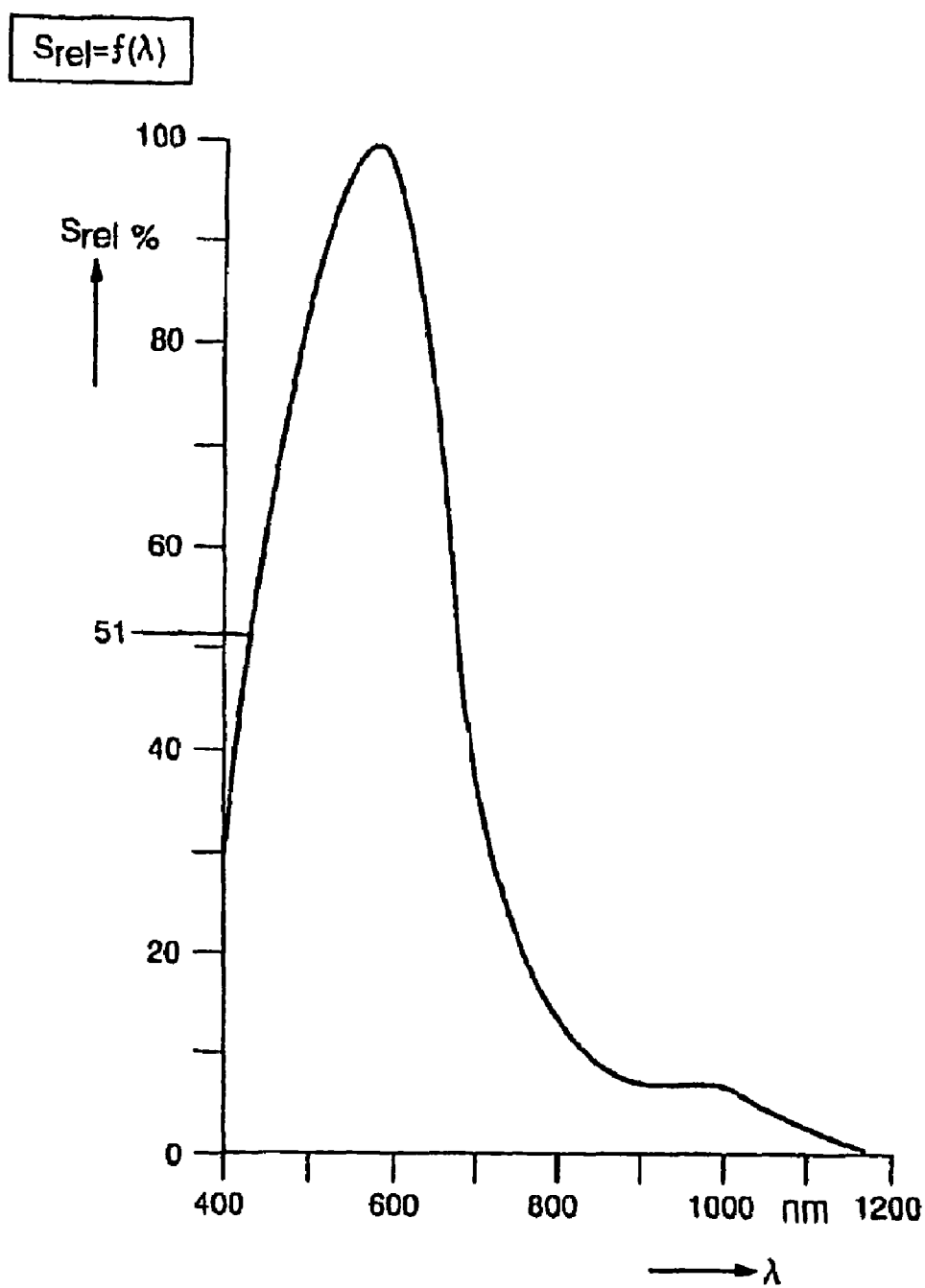
FIG. 7 is a plot of the typical spectral response of an OSRAM BPW 21 Silicon Photodiode.

In one embodiment the sensor 44 is a SiC UV photodiode detector that has a UV spectral response that is suitable for detecting the presence of a flame in the exhaust path. Referring to FIG. 6, a dramatic spike 50 is shown in a plot of the radiant emission energy from a burning hydrocarbon fuel the spectral radiant intensity of the emission is centered at 310 nm. FIG. 7 displays, the spectral response 51 for a BPW21 Silicon Photodiode useful for detecting the emission of the flame of a burning hydrocarbon with its most effective range being about 300 to 800 nm.

Currently only a few different types of sensors are utilized to monitor the energy output of flame mostly because of cost associated with choosing other less common sensors. This list represents a few of possible wavelengths that one may possibly wish to monitor to determine the presence of flames as alternatives to the current sensors currently utilized.

| Flame Species wavelength (nm) | Element Center Wavelength (nm) | Emission Species (compound or molecule) | Relative Emission Strength 1 to 7 | Element I.D. | Relative Electronic Emission Strength | Comments about emissions |
|---|---|---|---|---|---|---|
| | 234.8 | | | Be | 950 | |
| | 234.9 | | | As | 350 | |
| | 249.7 | | | B | 1000 | |
| | 255 | | | P | 950 | |
| | 265.9 | | | Pt | 2000 | |
| | 282 | | | Hf | 1200 | |
| | 287.8 | | | Sb | 1000 | |
| | 288.2 | | | Si | 1000 | |

-continued

| Flame Species wavelength (nm) | Element Center Wavelength (nm) | Emission Species (compound or molecule) | Relative Emission Strength 1 to 7 | Element I.D. | Relative Electronic Emission Strength | Comments about emissions |
|---|---|---|---|---|---|---|
| | 303.9 | | | Ge | 750 | |
| 306.4 | | OH— | 6 | Bi | 9000 | |
| | 306.8 | | | | | |
| 312.2 | | OH— | 6 | | | |
| 314.4 | | CH | 7 | | | |
| 315.66 | | CH | 6 | | | |
| 318.5 | | OH— | 2 | | | |
| | 322.1 | | | Ir | 5100 | |
| 325.4 | | OH— | 1 | | | |
| | 326.5 | | | Cu | 10000 | |
| | 331.1 | | | Ta | 1100 | |
| 336 | | NH | 2 | | | |
| 358.4 | | CN | 3 | | | |
| 358.6 | | CN | 3 | | | |
| 358.7 | | C2 | 3 | | | |
| 359 | | CN | 2 | | | |
| | 379.8 | | | Mo | 29000 | |
| 386.2 | | CN | 1 | | | |
| 387.1 | | CN | 6 | | | |
| 388.3 | | CN | 6 | | | |
| 387.2 | | CH | 6 | | | |
| | 396.1 | | | Al | 9000 | |
| | 403.3 | | | Mn | 27000 | |
| | 405.8 | | | Pb | 95000 | |
| | 407.9 | | | Nb | 12000 | |
| | 413.8 | | | Ce | 2700 | |
| | 417.2 | | | Ga | 10 | |
| | 422.7 | | | Ca | 50 | |
| | 426.5 | | | Cr | 20000 | |
| | 426.7 | | | C | 1000 | |
| 431.2 | | CH | 7 | | | |
| | 432 | | | W | 2200 | |
| 432.4 | | CH | 7 | | | |
| | 435.8 (253.6) | | | Hg | 4000 (15000) | |
| 436.5 | | C2 | 7 | | | |
| 437.1 | | C2 | 7 | | | |
| | 437.9 | | | V | 12000 | |
| 438.3 | | C2 | 7 | | | |
| | 439.7 | | | Fe | 3000 | |
| | 442 (352.4) | | | Ni | 110 (8200) | |
| | 451.1 | | | In | 18000 | |
| | 452.5 | | | Sn | 40 | |
| | 455.4 | | | Ba | 65000 | |
| | 458 (460.3) | | | Cs | 100000 | |
| 466.9 | | C2 | 7 | | | |
| | 467 | | | Sr | 65000 | |
| 467.9 | | C2 | 7 | | | |
| 468.5 | | C2 | 7 | | | |
| 469.8 | | C2 | 7 | | | |
| 471.5 | | C2 | 7 | | | |
| 473.7 | | C2 | 7 | | | |
| 477 | | C2 | 2 | | | |
| | 477.2 | | | Zr | 870 | |
| | 481.4 (345) | | | Co | 100 (21000) | |
| | 498.7 | | | Ti | 5800 | |
| 499.7 | | C2 | 7 | | | |
| 509.8 | | C2 | 7 | | | |
| 512.9 | | C2 | 7 | | | |
| 516.5 | | C2 | 7 | | | |
| | 518 (285.2) | | | Mg | 400 (6000) | |
| | 535 | | | Tl | 18000 | |
| | 546 (328) | | | Ag | 1000 (55000) | |
| 547 | | C2 | 5 | | | |
| 550.2 | | C2 | 6 | | | |
| 554.1 | | C2 | 6 | | | |
| 558.6 | | C2 | 6 | | | |
| 563.6 | | C2 | 6 | | | |
| | 589.5 | | | Na | 80000 | |
| 590 | | C2 | 2 | | | |
| 592.3 | | C2 | 2 | | | |
| 595.9 | | C2 | 5 | | | |
| 600.49 | | C2 | 5 | | | |
| 605.9 | | C2 | 5 | | | |

-continued

| Flame Species wavelength (nm) | Element Center Wavelength (nm) | Emission Species (compound or molecule) | Relative Emission Strength 1 to 7 | Element I.D. | Relative Electronic Emission Strength | Comments about emissions |
|---|---|---|---|---|---|---|
| 612.2 | | C2 | 5 | | | |
| 619.1 | | C2 | 5 | | | |
| | 627.8 | | | Au | 600 | |
| | 636.2 | | | Zn | 1000 | |
| | 643.9 | | | Cd | 2000 | |
| 653.4 | | C2 | 1 | | | |
| 659.9 | | C2 | 2 | | | |
| 667.7 | | C2 | 2 | | | |
| 676.3 | | C2 | 2 | | | |
| | 678 (671) | | | Li | 3600 | |
| 685.9 | | C2 | 2 | | | |
| 722.7 | | H2O | 6 | | | |
| 746 | | OH— | 6 | | | |
| | 766.5 | | | K | 25 | |
| 771.5 | | C2 | 6 | | | |
| | 780 | | | Rb | 90000 | |
| 785 | | OH— | 6 | | | |
| 790.8 | | C2 | 6 | | | |
| 795.7 | | H2O | 6 | | | |
| 810.8 | | C2 | 6 | | | |
| 822.7 | | H2O | 6 | | | |
| 827.8 | | OH— | 6 | | | |
| 875.1 | | C2 | 6 | | | |
| 898.1 | | C2 | 6 | | | |

Infrared

| Original Wavelength (microns) | Band Head Center | | | |
|---|---|---|---|---|
| 1.8752 | | H2O | v. strong | |
| 2.3467 | 2.2929 | CO | " | vib-rotation overtone |
| 3.3762 | 2.3221 | CO | " | |
| 2.4064 | 2.3519 | CO | " | |
| 2.6618 | | H2O | v. strong | |
| 2.6912 | | CO2 | strong | |
| 2.7337 | | H2O | strong | |
| 2.7672 | | CO2 | strong | |
| 2.8007 | | OH— | weak | masked by CO2 and H2O |
| 3.1722 | | H2O | strong | |
| 4.2557 | 4.1713 | CO2 | v. strong | modified by self absorption |
| 4.279 | 1.1912 | CO2 | | |
| 4.2955 | 4.211 | CO2 | | |
| 4.297 | 4.2057 | CO2 | | |
| 4.3014 | 4.214 | CO2 | | |
| 4.6644 | | CO | moderate | self absorabed and masked by CO2 |
| 4.7228 | | CO | " | |
| 4.7825 | | CO | " | |
| 6.2698 | | H2O | v. strong | |
| 13.8699 | | CO2 | moderate | intensity about 1/200th of 4.3 micron intensity |
| 14.9794 | | CO2 | " | |

There is thus provided a fiber optic linked flame sensor which provides rapid, reliable, and cost effective optical monitoring of the presence of flame within the exhaust chamber of a gas turbine engine to provide reduced maintenance costs through the accurate diagnosis of the presence of a clogged fuel nozzle without teardown of the turbine.

As discussed previously the spectral energy indicating the presence of flame in the exhaust of a turbine can encompass the entire visible spectrum and wavelengths of 200 to 1000 nm. The wavelength monitored with sensors can ideally range from 200 nanometers (nm) to 800 nm. The CH emission band head at 431 nm, monitoring from 350 to 500 nm, and the OH emission band head at 310 nm monitoring from 250 nm to 400 nm have been found to be effective in practice. Additional spectral data from the current broadband region of about 550 nm to 650 nm, and the broadband region of 400 nm to 500 nm are also effective in flame detection given the absence of background radiation sources with sufficient energy to excite these sensors.

Further sensor detection of flame can be accomplished in the infrared regions. The regions of 2.9 and 4.4 micrometers that have been associated with flame detection and therefore sensors capable of fast response time in the region of approximately 1.0 to 5.0 micrometers can also satisfy the flame detection requirements. The sensor utilized should be capable of responding in less than approximately 100 microseconds (μs), but may still be effective between 100 and 300 microseconds to effectively monitor the presence of flame in the exhaust depending on its duration within the spectrum discussed above. A detection system based solely on infrared technology would require fiber optic core materials other than fused silica. One option would be to use sapphire, however at this time this option would be extremely expensive and a less cost effective solution.

Figure 13:
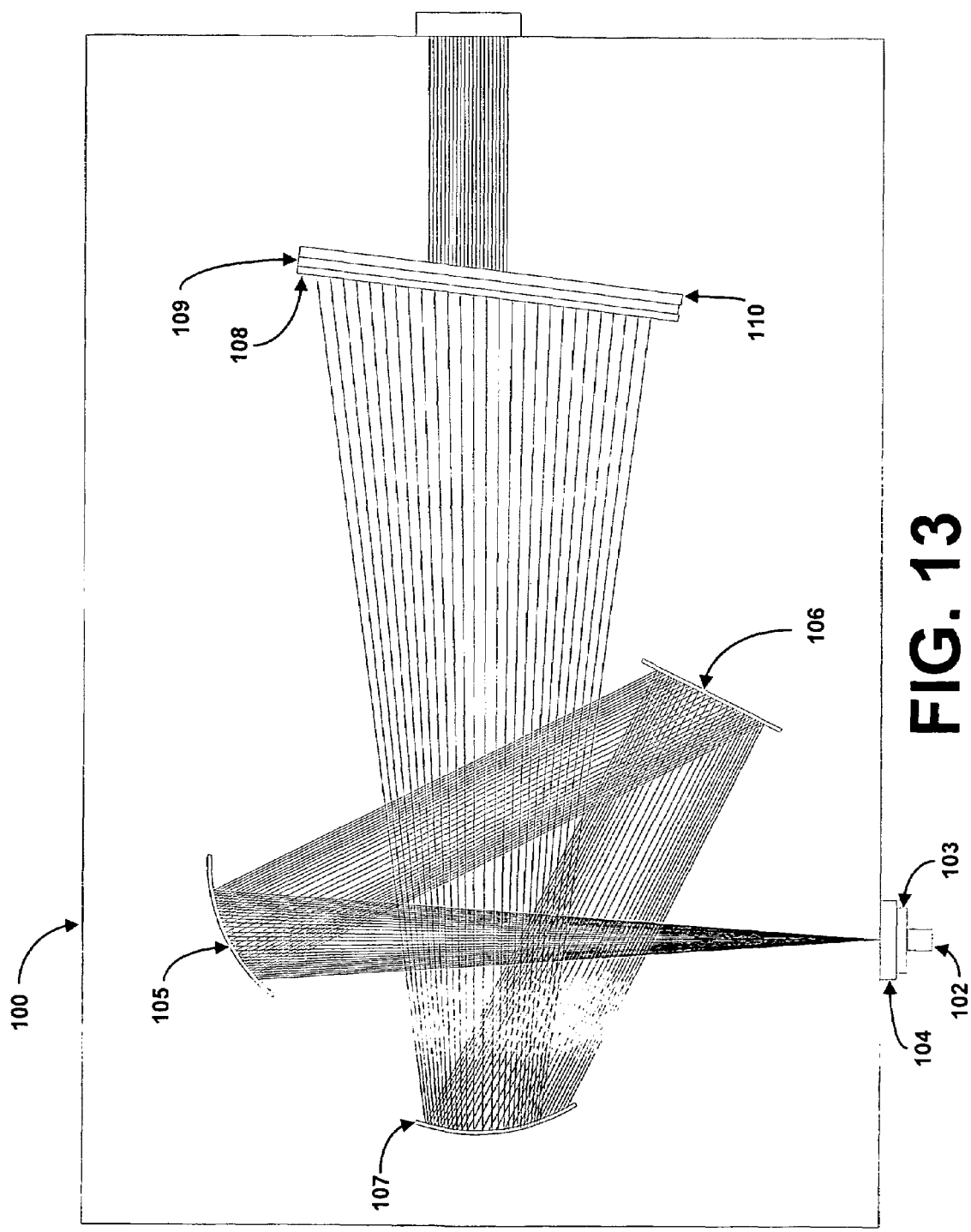
FIG. 13 is a schematic diagram illustrating an example of a spectrometer.

In another embodiment remote monitoring of the flame event using a fast scanning miniature spectrometer is performed. FIG. 13 is a schematic diagram illustrating an example of a spectrometer 100. This embodiment uses fiber optics to locate the spectrometer 100 to an environment, which is conducive to its operating limits. The basic principle of operation would be as follows: Light gathered by the view port attached to the exhaust plenum and transmitted by the fiber optic cable to a fiber optic connection 102, enters the spectrometer 100 through a fixed aperture 103 and optical filter 104. The light energy then strikes a collimating mirror 105 and is directed at the diffraction grating 106. The light is refracted by the grating 106 and directed toward a focusing mirror 107. The diffracted light strikes the focusing mirror 107 where it is reflected and focused onto a detector array 109. In front of the detector array 109 is a lens 108, which concentrates light onto the individual detectors 109. There is also an order sorting filter 110 known in the art to limit the effect of second and third order wavelength harmonics. Finally, each detector element (pixel) responds to the individual wavelength of light that strikes it. The signals are then fed into a microprocessor, which interprets the various signal strengths and produces information relative to the intensity of the individual wavelengths of light as received by the detector array. This information can then be used to determine the spectral nature of the flame condition being monitored. This sensor technology as produced by Ocean Optics Inc., Dunedin, Fla.

This can be configured and customized to meet the needs of the application, i.e., usable spectral range. The total spectral capability of such a system can be realized from 200 nm up to 1600 nm. However, to scan the entire range would require more than one spectrometer being supplied the same energy from the flame. The optical signal could be split and fed to however many spectrometers are required in order to accurately assess the spectral nature of the flame.

The basic configuration of such a system as produced by StellarNet Inc, Oldsmar, Fla., is describe below. StellarNet's miniature fiber optic spectrometers, industrial process probes, optical fibers, light source accessories and SpectraWiz® software are process control and quality control monitor workhorses for analytical instrumentation designed to measure light wavelength absorbance, transmission, reflection, color, emission, irradiance, and fluorescence. Measurements for ranges in the ultraviolet (UV 190–400 nm), Visible color (VIS 350–850 nm), short-wave Near Infrared (NIR 500–1200 nm), and Near Infrared (XNIR 1200–1600 nm) are easily performed by portable EPP2000™ (parallel port interface) or ISA2000™ (PC plug-in card) fiber optic spectrometers.

CCD or Photo Diode Array spectrograph optics have no moving parts or detector sockets and could be utilized in flame detection. The units are designed to be vibration tolerant and use thermal stabilization suitable for process applications. The EPP2000C™ spectrometer has no mirrors. It uses an aberration corrected holographic, concave diffraction grating for superb imaging while minimizing stray light. This instrument covers the UV and VIS ranges in one unit (190–850 nm).

There is also similar technology developed, which will provide the same type of information from 1.0 micrometers (µm) to 5.0 µm. This equipment is available through Spectraline Inc., West Lafayette, Ind. There has already been work done and published in the area of flame research using this type of equipment. NASA Tech Briefs, published in November 2000 authored by Yudaya Sivathanu and Rony Joseph of En'Urga Inc. for Glenn Research Center.

A spectrometer has been developed for acquiring transient emission and absorption spectra in the wavelength range from 1.2 to 5.0 µm and could be used to characterize flames, turbulence, and other transient phenomena that interact with infrared radiation. In one potential embodiment an infrared spectrometer measures the spectrum at a repetition frequency of 390 Hz. The spectrometer optics include a chopper, two prisms that serve as dispersers, and parabolic optical-path-folding mirrors. The spectrally dispersed light is projected onto a 160-pixel linear array of lead selenide photodetectors. The spectrometer also includes electronic circuitry for controlling the chopper, synchronizing readout from the pixels with the chopping cycle, and sending data to an external computer or data logger.

A method of determining presence of flame or fuel nozzle condition of the present invention comprises the steps of: providing an Electro-Optics Module (EOM) 40, Fiber Optic Cable Assembly 30 and an Optical Viewing Port 20; monitoring the operation of the turbine with a sight pipe prior to the commencement of operation of the turbine; operating the gas turbine; transferring radiant energy from the turbine exhaust section via a fiber optic cable 30; determining with the EOM 40 that a condition of flash exists; indicating to the operator the presence of flash in the turbine exhaust.

A method of detecting the presence of flame in the exhaust further comprises the steps of providing sensor(s) and optional signal processing electronics. The Optical View Port 20 mounts to the gas turbine engine and collects the radiant energy from the flame and focuses it on the tip of the Fiber Optic Cable Assembly 30. The Fiber Optic Cable Assembly 30 transmits the radiant energy collected by the Optical View Port to the sensor(s) located inside the EOM 40.

The sensor(s) are assembled in modules optionally containing custom discrete optical filters and amplification circuitry. The optical filters guarantee that the spectral energy reaching the sensor elements is restricted to wavelengths specific to the signatures of the flame source.

The method of detecting the presence of flame in the exhaust further comprises the steps of converting an analog signal to a digital signal; comparing signals via an algorithm; storing processed signal with a time date stamp within a memory. The sensor analog signals, which are proportional to the intensity of the radiant energy received, are converted to digital signals and fed into the EOM's microprocessor where they are compared using the Meggitt developed algorithms. The result of the processed signal is a determination of flame signal intensity and its duration. These time and date stamped signal traits are stored within the EOM's self-contained memory for later evaluation. Additionally these signals are available to be fed to the Condition Based Monitoring data collection center for the engine.

One embodiment uses a fiber optic linked flame sensor for continuous optical monitoring of the exhaust of a gas turbine engine. The system includes a high temperature optical probe 20, a fiber optic cable 30, and electro-optics module 40. The high temperature probe is mounted on the engine skin and sighted in a manner so as to view the exhaust gas for presence of flame that indicates fouling of the fuel nozzle or otherwise a condition of uncontrolled combustion. The appropriately constructed fiber optic cable connects the high temperature probe with the electro-optics module. The radiation transmitted via the fiber optic cable is then received by a photodiode located in the electro-optics module and coupled with appropriate electronics.

Test Results-Allison-501 Turbine

Figure 12:
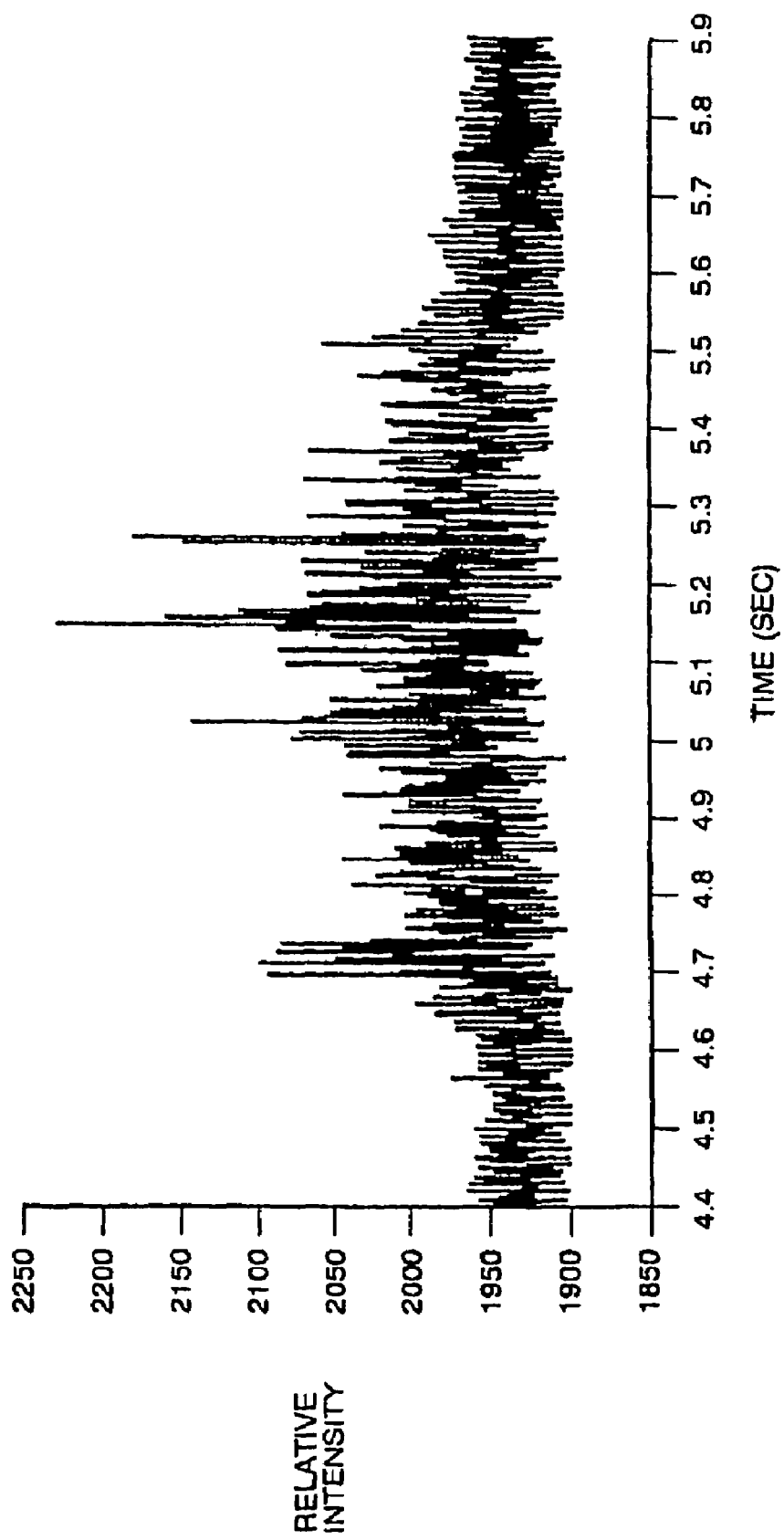
FIG. 12 is a reading (raw signal) of spectral energy observed in the exhaust section of a gas turbine with a clogged nozzle.

The Allison-501 turbine consists of six nozzles arranged in a circular pattern with a number assigned to the nozzle corresponds to the position on the turbine, when viewed from the compressor end and numbered in a counterclockwise fashion. The invention disclosed herein is tested on an Allison 501 turbine but it is applicable to all other known turbines and configurations. One skilled in the art would be able to adapt this preliminary testing information to monitor any other turbine's operating condition and nozzle condition to prevent damage to the hot section of a turbine from clogged or dirty fuel nozzles. In FIG. 10 the conditions of the nozzles are examined. In FIG. 11 the severity of flash is related to the condition of the nozzles of the turbine. In FIG. 12 the raw data of a test run is displayed.

The table below represents data collection from a series of tests involving one embodiment of the instant invention. The data collection was manually initiated approximately 5 to 10 seconds before the gas turbine was started. All runs that displayed flash in the exhaust were displayed in greater detail for the portion of the period of flash.

Figure 15:
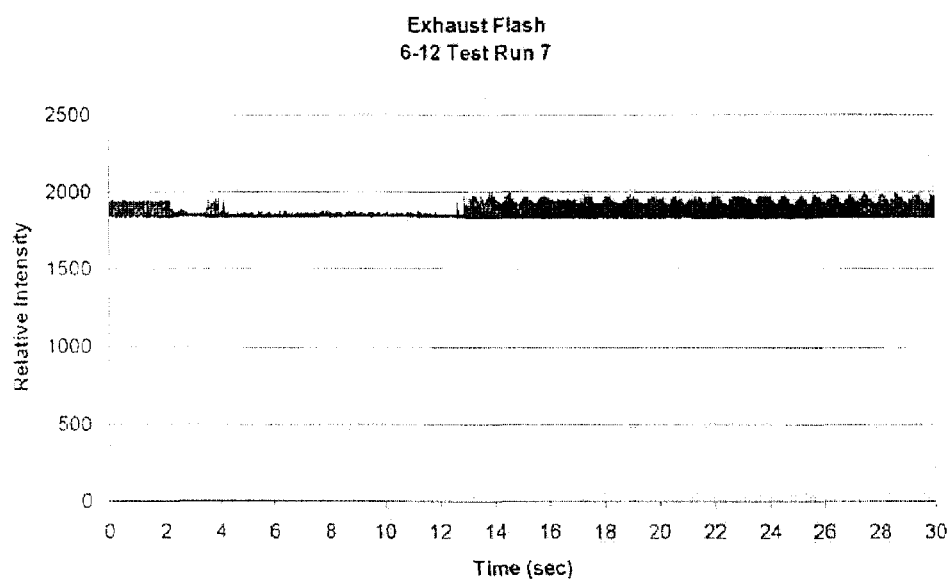
FIG. 15 is a graph showing results of test run 7.

Subsequent test run 7 having similar nozzle condition failed to show any flash present with similar conditions, as shown by FIG. 15.

Figure 16A:
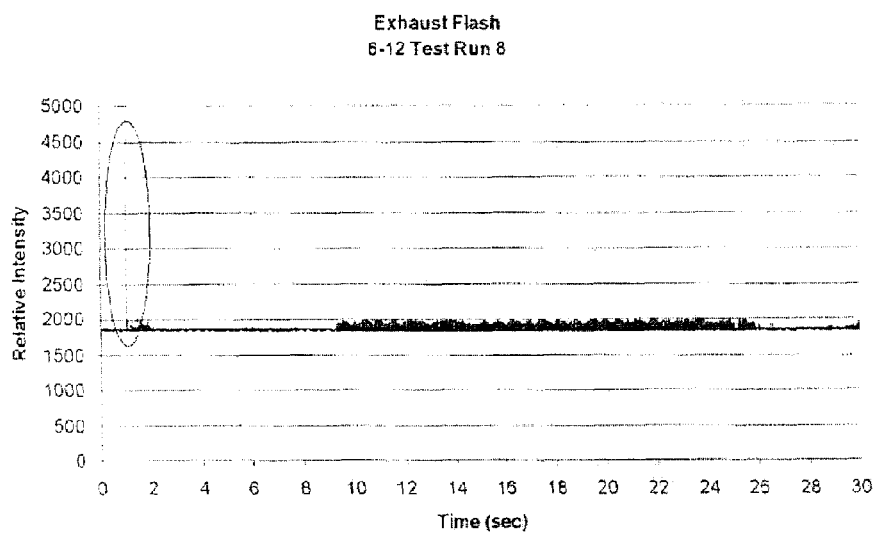
FIG. 16A and FIG. 16B are graphs showing results of test run 8.
Figure 16B:
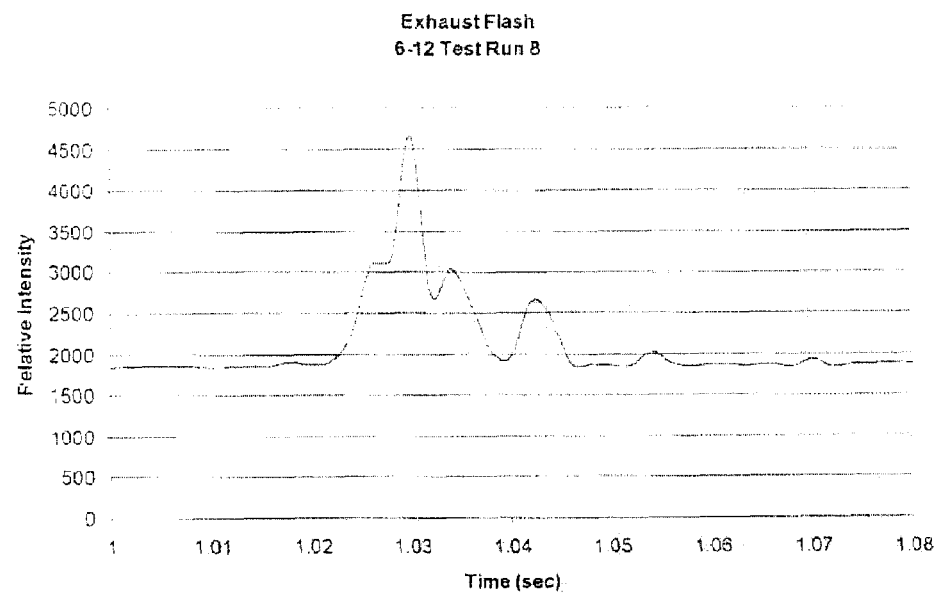

Test run 8 having nozzle 3 and 5 showing severe clogging and nozzles 2 and 6 showing partial clogging displayed a flash event of greater intensity, as shown by FIG. 16A and FIG. 16B. The intensity of the flash being relatively proportional to the overall condition of the state of the nozzles of the turbine.

Figure 17:
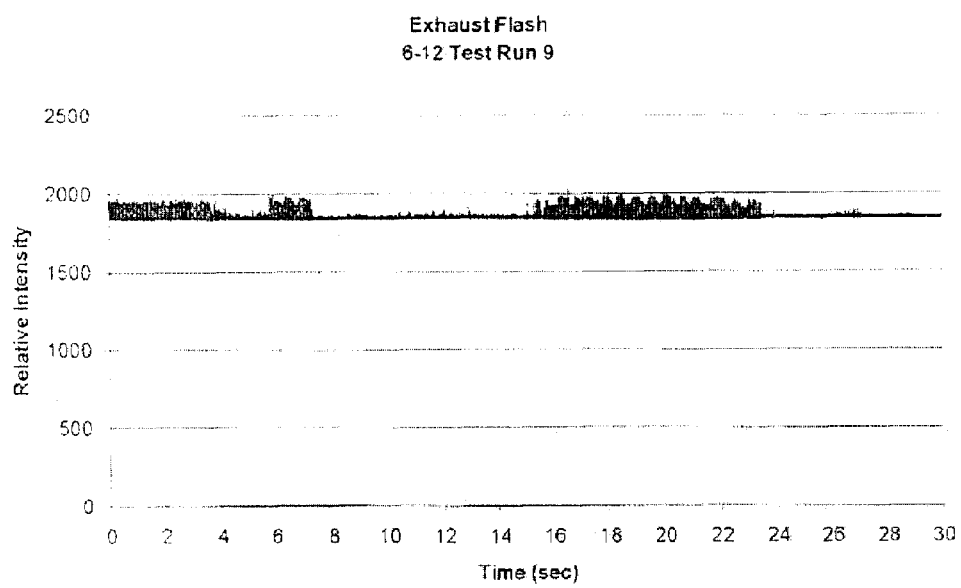
FIG. 17 is a graph showing results of test run 9.

Test run 9 having similar nozzle condition to that of test 8 failed to register a flash event even though evidence of visual flash was recorded during testing, as shown by FIG. 17. Individuals conducting the tests visually determined the presence of flash. There was some confusion as to whether Test run 9 ever truly produced a visible flash.

| Date | Test Run | Nozzle Condition (Severity Ranking)* | | | | | | Evidence Of Visual Flash | Optical Sensor Detection (Yes/No) | Flash Duration (ms) |
| --- | --- | --- | --- | --- | --- | --- | --- | --- | --- | --- |
| | | Nozzle 1 | Nozzle 2 | Nozzle 3 | Nozzle 4 | Nozzle 5 | Nozzle 6 | | | |
| 12-Jun | 1 | Clean | Clean | Clean | Clean | Clean | Clean | No | Not Taken | n/a |
| | 2 | Clean | Clean | Clean | Clean | Clean | Clean | No | Not Taken | n/a |
| | 3 | Clean | Clean | Clean | Clean | Clean | Clean | No | Not Taken | n/a |
| | 4 | Clean | Clean | 1 | Clean | Clean | 2 | Small Flash | Not Taken | n/a |
| | 5 | Clean | Clean | 1 | Clean | Clean | 2 | No | Data Lost | n/a |
| | 6 | Clean | 4 | 1 | Clean | 3 | 2 | No | Yes | 50–80 |
| | 7 | Clean | 4 | 1 | Clean | 3 | 2 | No | No | n/a |
| | 8 | Clean | 3 | 5 | Clean | 4 | 2 | Small Flash | Yes | 22 |
| | 9 | Clean | 3 | 5 | Clean | 4 | 2 | Small Flash | No | n/a |
| | 10 | Clean | 3 | 5 | Clean | 4 | 6 | Large Flash | Yes | 930 |
| | 11 | Clean | 3 | 5 | Clean | 4 | 6 | Small Flash | Yes | 330 |
| 13-Jun | 1 | Clean | 3 | 5 | Clean | 4 | 6 | Large Flame | Yes | 800 |
| | 2 | Clean | 3 | 5 | Clean | 4 | 6 | 2 Flashes | Yes | 470 |
| | 3 | Clean | 3 | 5 | Clean | 4 | 2 | Medium Flash | Yes | 40 |
| | 4A | Clean | 4 | 1 | Clean | 3 | 2 | No | Yes | 33 |
| | 4B | Clean | 4 | 1 | Clean | 3 | 2 | Medium Flash | Yes | 38 |
| | 5 | Clean | Clean | 1 | Clean | Clean | 2 | Minimum Flash | ?Yes? | 30 |
| | 6 | Clean | Clean | 1 | Clean | Clean | 2 | No | Yes | n/a |

Ranking # 1 - Least severe nozzle fouling
Ranking # 6 - Most severe nozzle fouling The table displays the information obtained from the test and the known condition of the nozzle immediately prior to the onset of testing confirmed through a visual inspection of each nozzle. The instant invention was shown to provide the time duration and relative intensity of the flash event. The data shown above shows a high correlation between the condition of the nozzle(s) and presence of flame in the exhaust and provide a strong predictive tool useful in determining a maintenance schedule for each independent gas turbine to maximize performance and eliminate unexpected downtime.

Figure 14A:
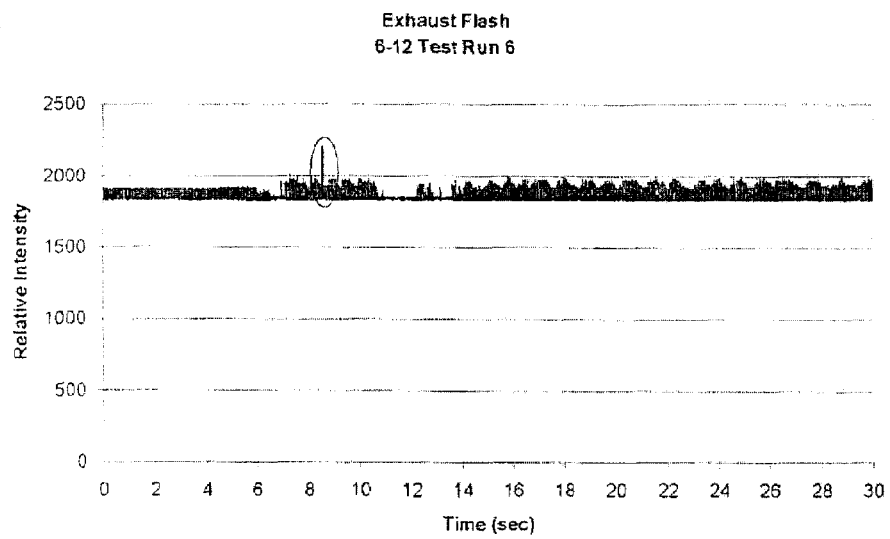
FIG. 14A and FIG. 14B are graphs showing results of test run 6.
Figure 14B:
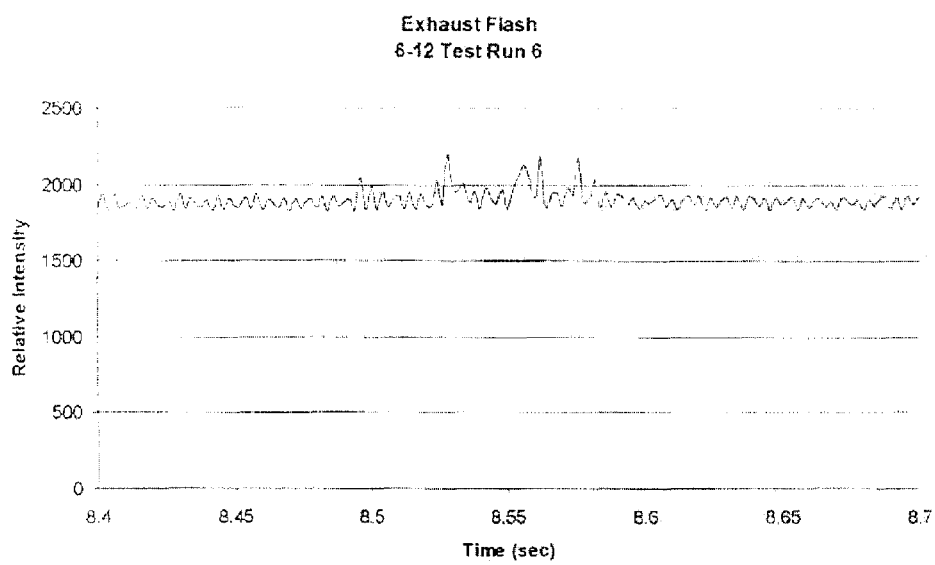

Exhaust flash was detected in test run 6 as shown by FIG. 14A and FIG. 14B with nozzle 2 and nozzle 5 displaying moderate to severe fouling out of the six nozzles present during turbine startup displayed at around 9 seconds into measurement circled on the graph of FIG. 14A. The flash event was displayed in greater detail showing the response of the instant invention to the short duration of the presence of flame in the initial stages of fouling of the turbines six fuel nozzles with the flash clearly showing an impulse response above the average intensity of the background radiation without the presence of flash in the exhaust.

Figure 18A:
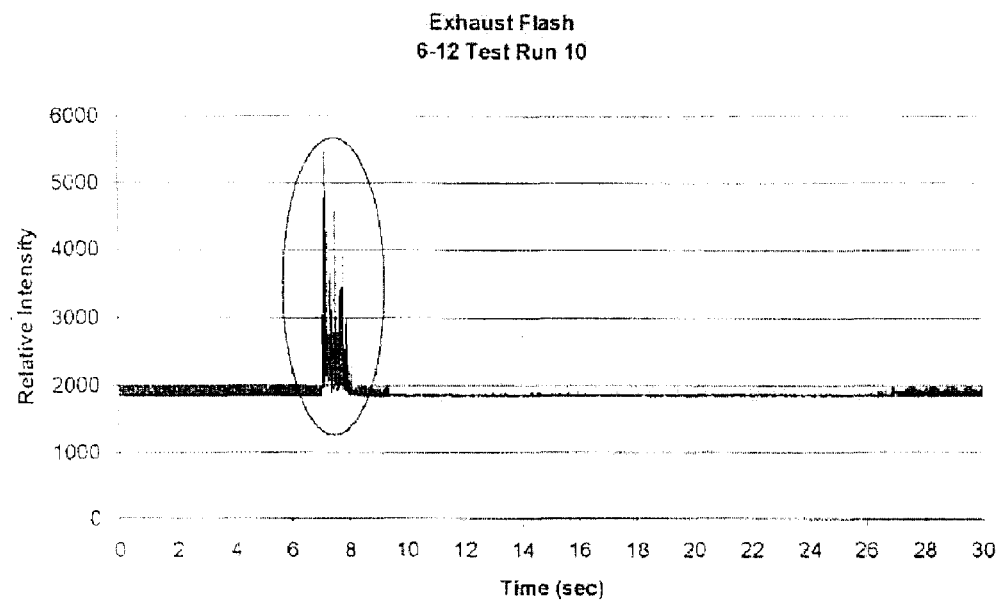
FIG. 18A and FIG. 18B are graphs showing results of test run 10.
Figure 18B:
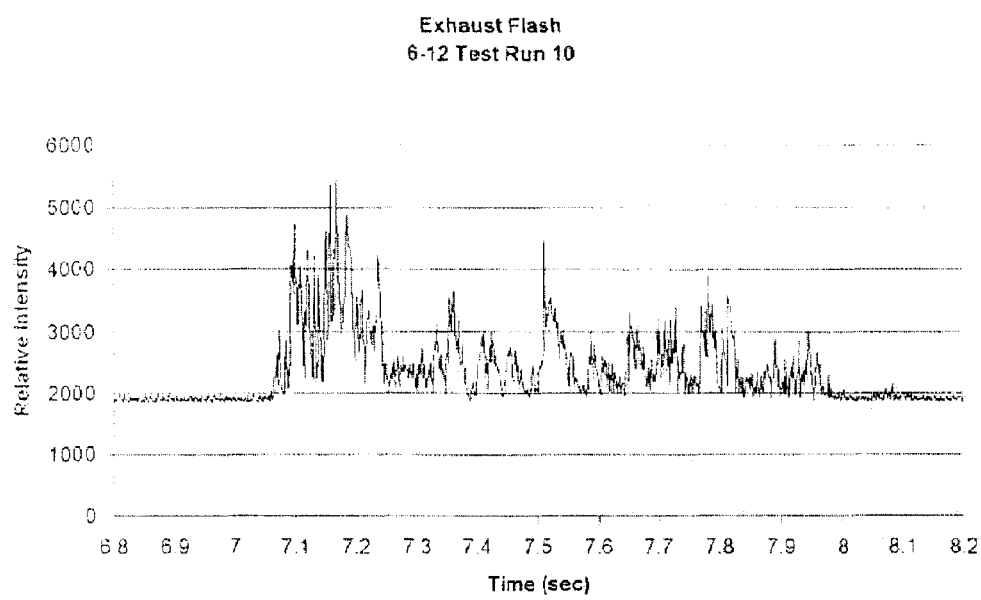

Test run 10 4 of the 6 fuel nozzles moderately to severely fouled producing both a high intensity flash with a long duration, as shown by FIG. 18A and FIG. 18B.

Figure 19A:
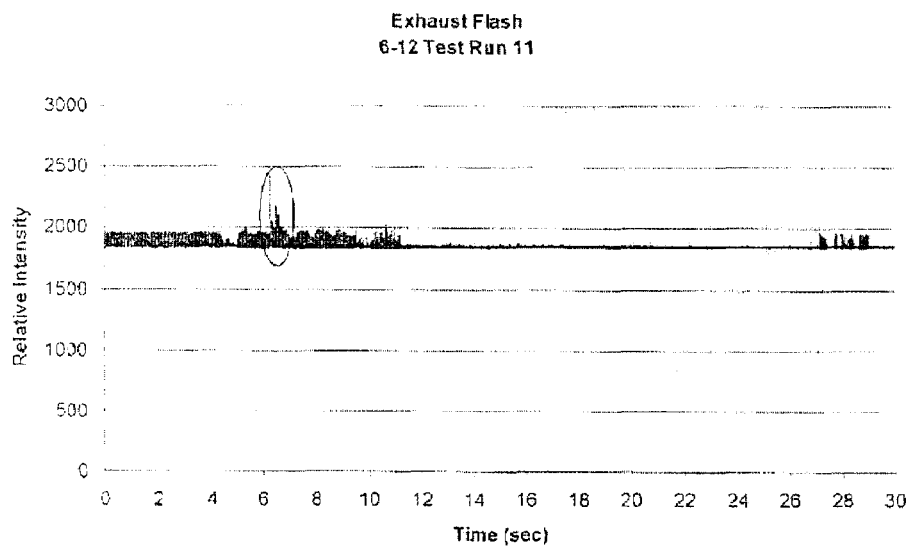
FIG. 19A and FIG. 19B are graphs showing results of test run 11.
Figure 19B:
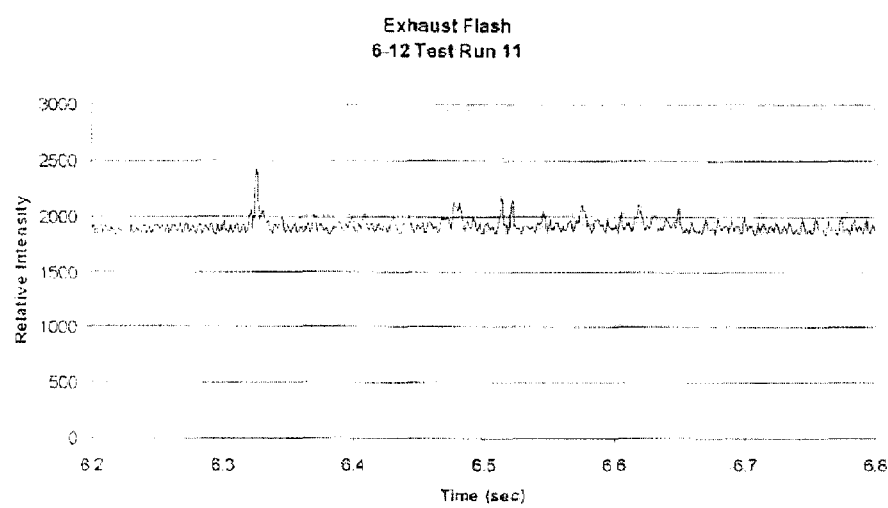

Test run 11 having similar nozzle condition to that of test run 10 has 4 of the 6 fuel nozzles moderately to severely fouled producing both a low intensity flash with a relatively long duration, as shown by FIG. 19A and FIG. 19B.

Figure 20A:
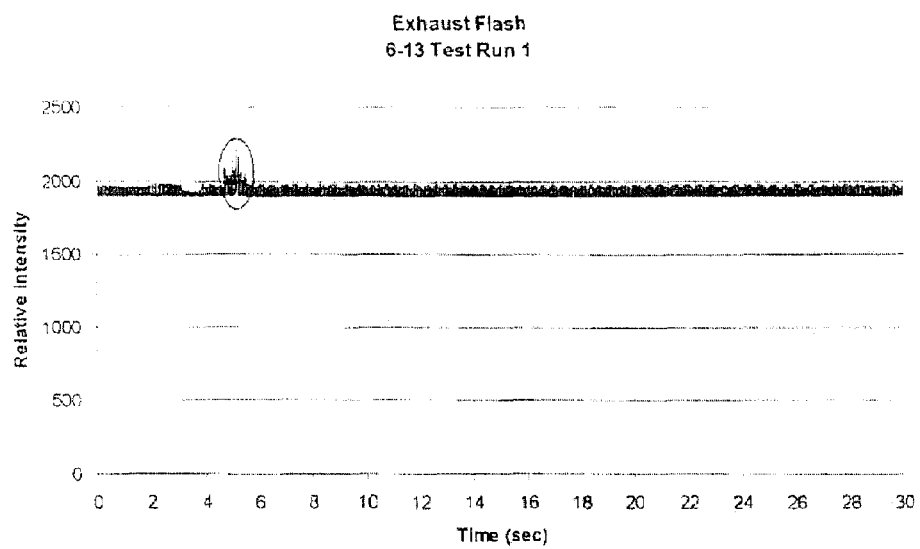
FIG. 20A and FIG. 20B are graphs showing results of test run 1.
Figure 20B:
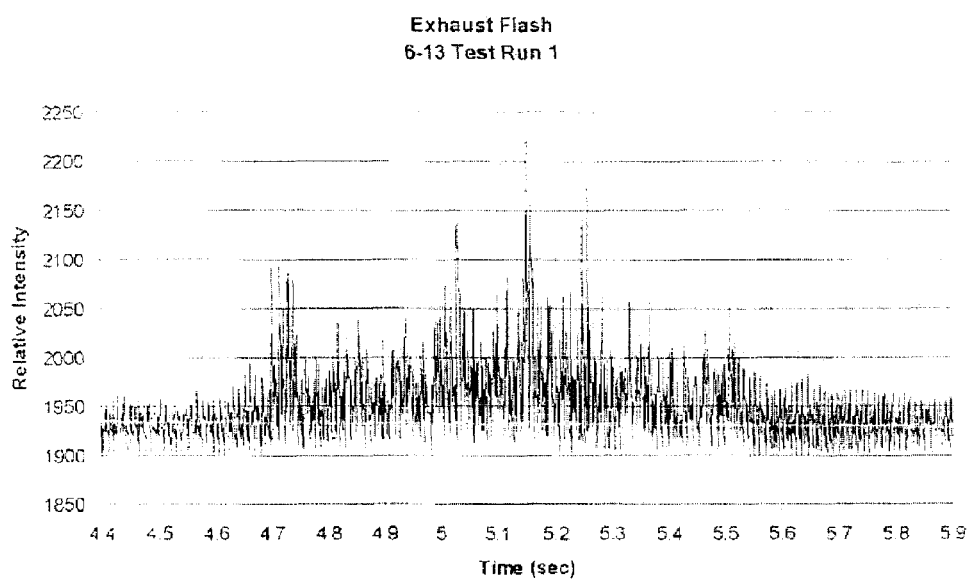

Test run 1, as shown by FIG. 20A and FIG. 20B, conducted on the next day of testing had the same nozzle condition to that of previous test run 11 having 4 of the 6 fuel nozzles moderately to severely fouled producing both a low intensity flash with a long duration.

Figure 21A:
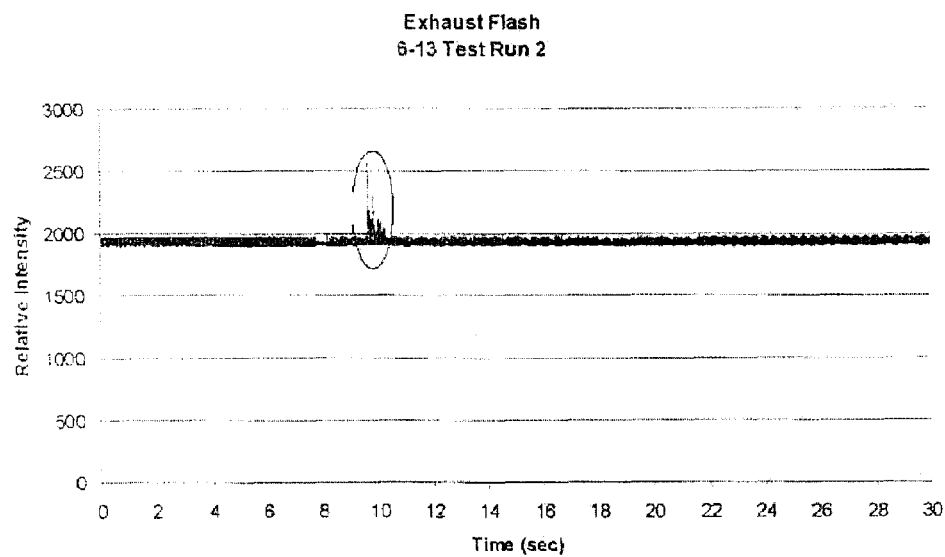
FIG. 21A and FIG. 21B are graphs showing results of test run 2.
Figure 21B:
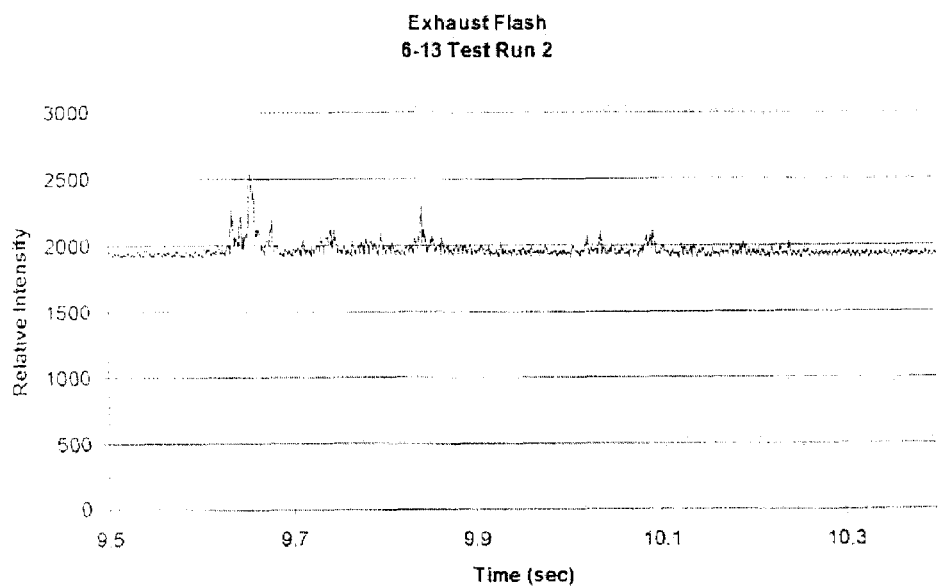

Test run 2, as shown by FIG. 21A and FIG. 21B, conducted on the second day of testing had the same nozzle conditions to that of previous test run 1 having 4 of the 6 fuel nozzles moderately to severely fouled producing both a low intensity flash with a long duration.

Figure 22A:
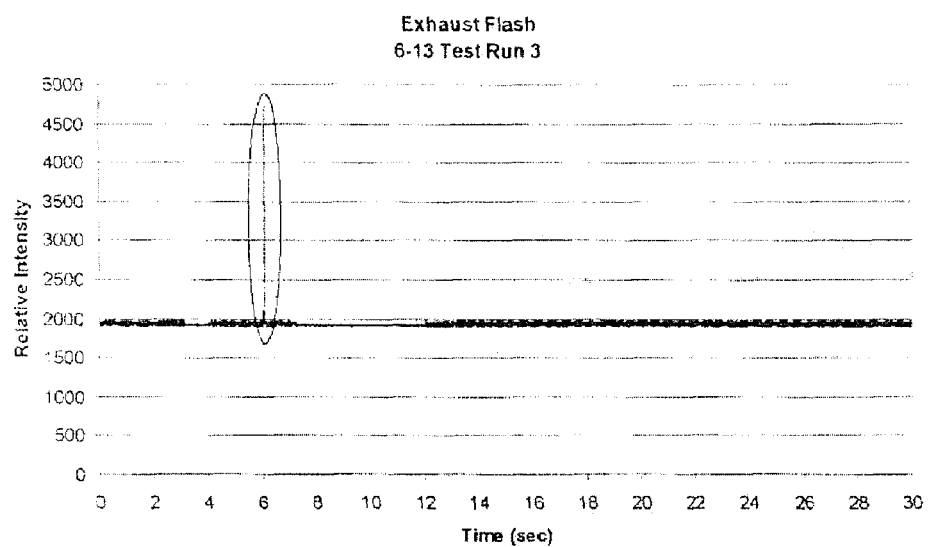
FIG. 22A and FIG. 22B are graphs showing results of test run 3.
Figure 22B:
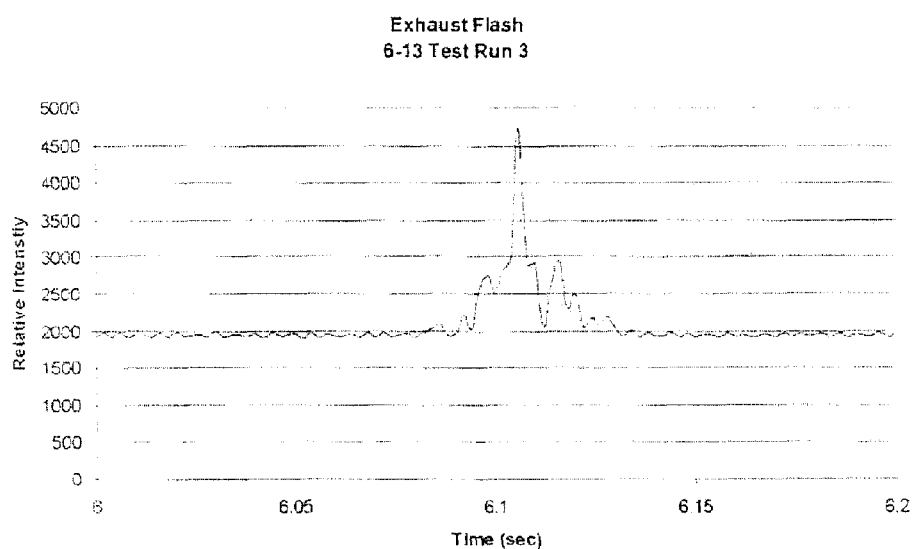

Test run 3, as shown by FIG. 22A and FIG. 22B, conducted on the second day of testing had similar nozzle condition to that of previous test run 2 having 3 of the 6 fuel nozzles moderately to severely fouled producing both a high intensity flash with a short duration.

Figure 23A:
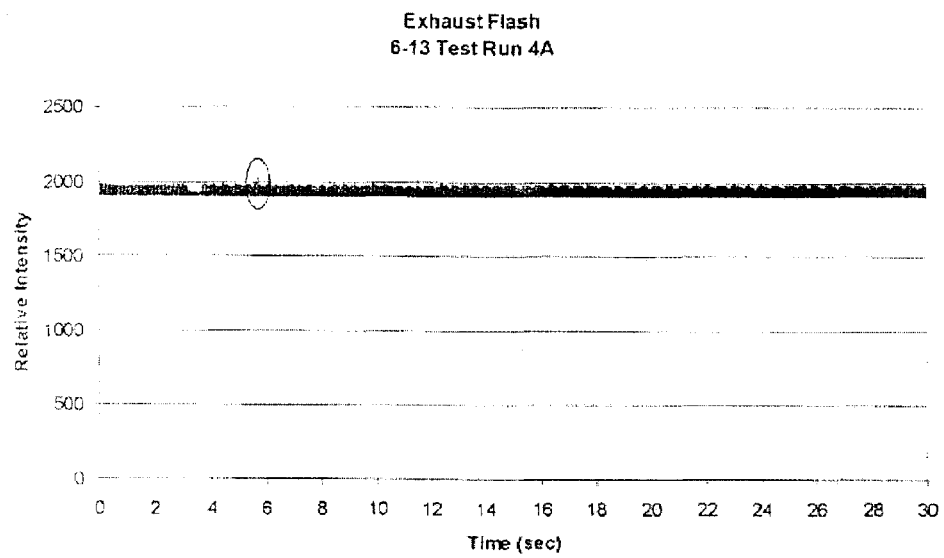
FIG. 23A and FIG. 23B are graphs showing results of test run 4A.
Figure 23B:
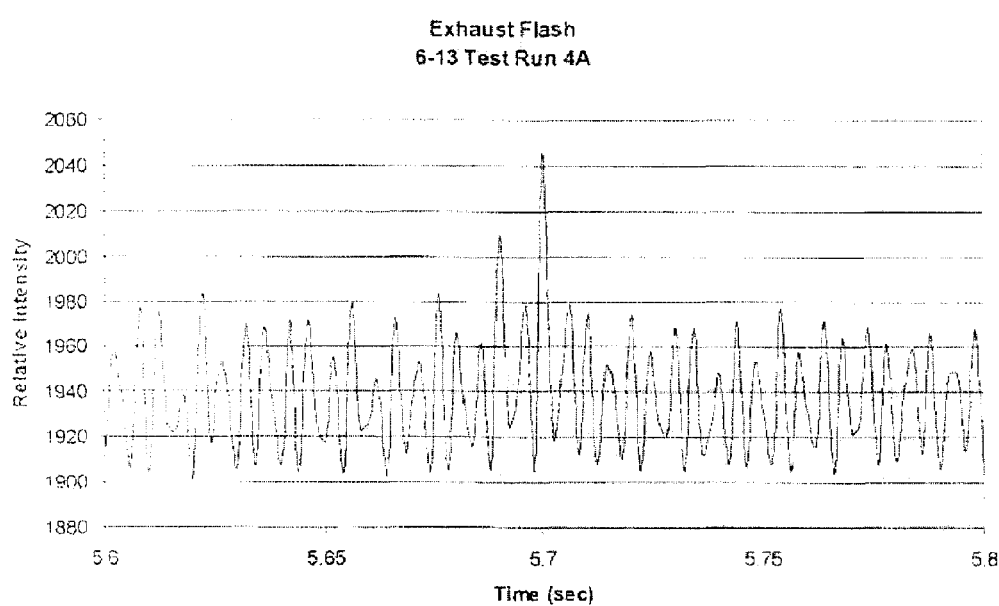

Test run 4A, as shown by FIG. 23A and FIG. 23B, conducted on the second day of testing had 2 of the 6 fuel nozzles moderately fouled producing both a low intensity flash with a short duration that was detected by the optical sensor but not visually.

Figure 24A:
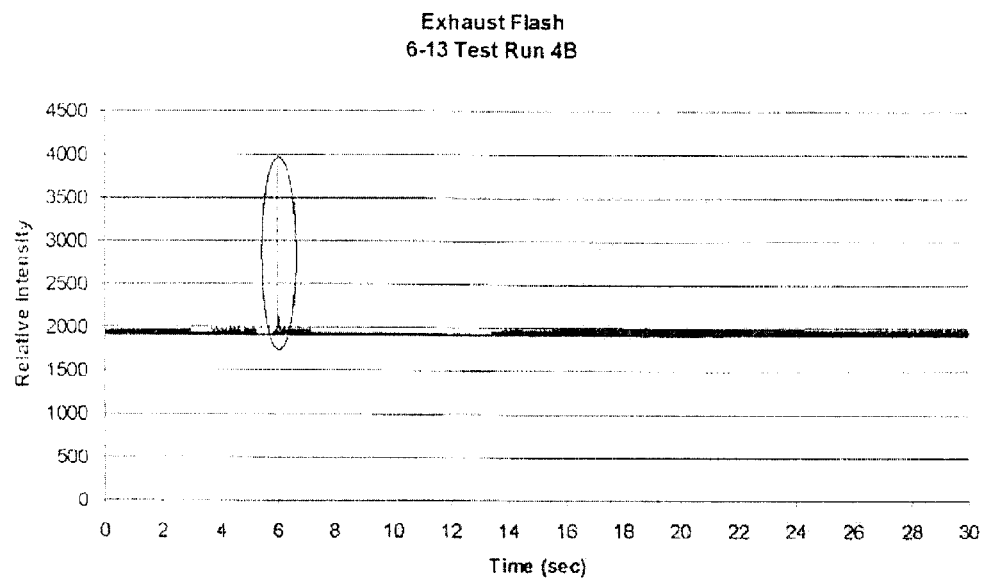
FIG. 24A and FIG. 24B are graphs showing results of test run 4B.
Figure 24B:
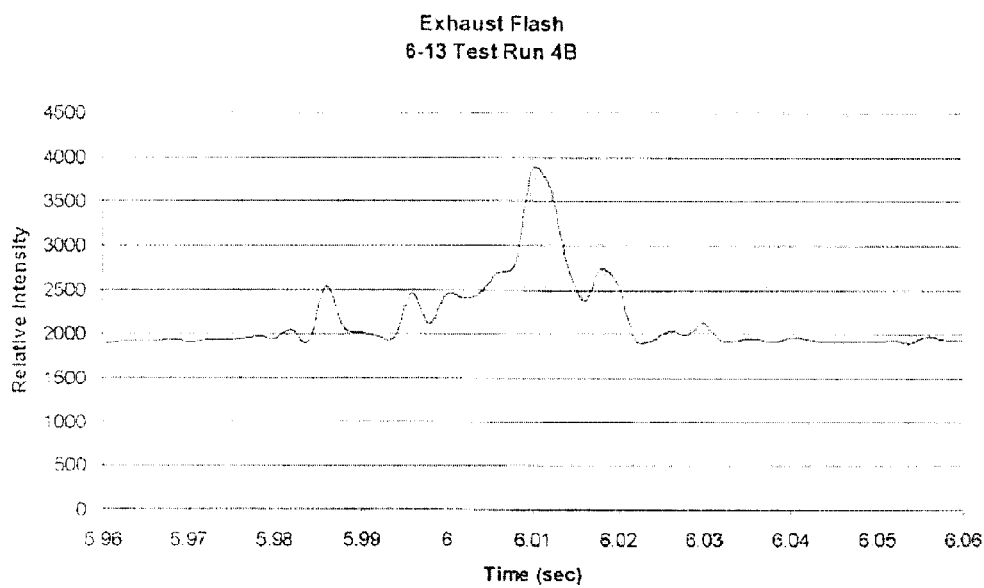

Test run 4B, as shown by FIG. 24A and FIG. 24B, having nearly identical conditions to run 4A displayed a high intensity flash with a short duration.

Figure 25A:
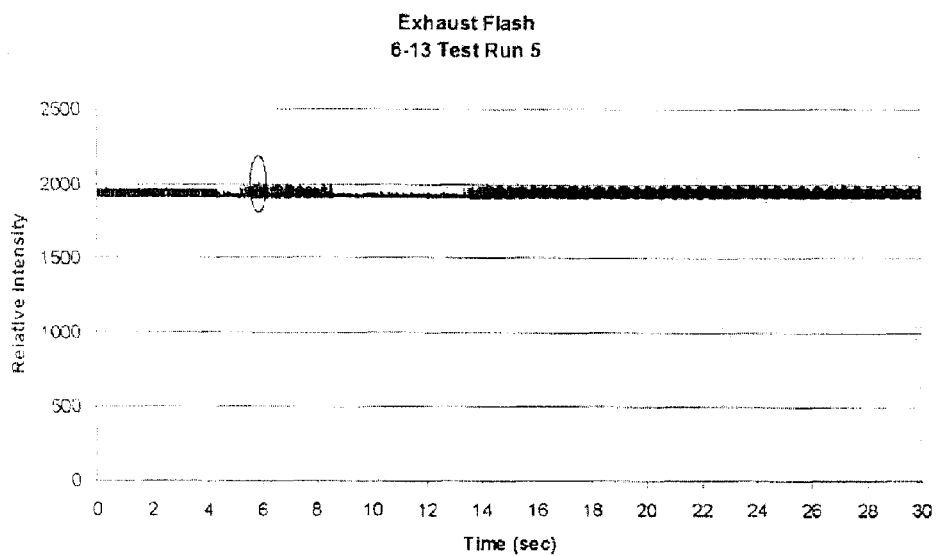
FIG. 25A and FIG. 25B are graphs showing results of test run 5.
Figure 25B:
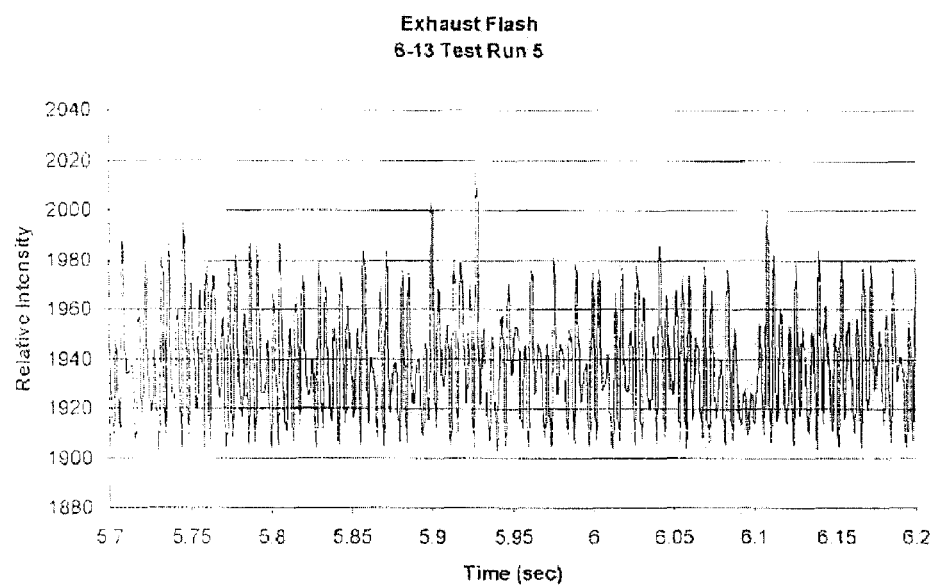

Test run 5 displayed, as shown in FIG. 25A and FIG. 25B, having 4 of the 6 nozzles clean, with 2 partially fouled produced a low intensity flash of short duration.

Figure 26:
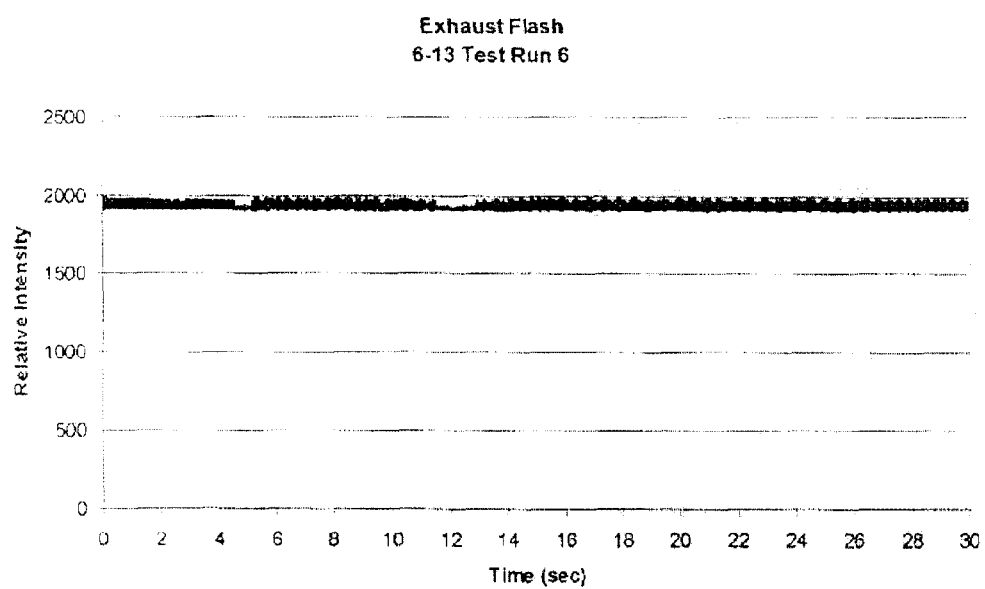
FIG. 26 is a graph showing results of test run 6.

Test run 6, as shown in FIG. 26, had identical nozzle condition to test 5 and no flash was detected. The test data above is not intended to be the only potential embodiment and is only an initial test using one embodiment.

The testing data obtained from the Allison 501 turbine shows the correlation between the presence and duration of flame in the exhaust of a turbine and the condition of the nozzles. Therefore analyzing the above preliminary data findings it is clear that with a single testing event of the startup of the gas turbine if the sensors detect a flame of high intensity (compared to the background radiation intensity) and/or a duration of a flame signature lasting for a period of at least 30 ms in duration it should indicate to the operator of the turbine that the majority of the nozzles may be partially fouled and that it is an indicator that maintenance should be performed preferably before damage to the turbine occurs. The results displayed in test runs 6, 8 and 10–11 on the first test date and test runs 1–4B on the second test as displayed in the table above are preliminary findings and would need to be correlated to costs to perform maintenance verses the probability of damage to the hot section of the turbine to determine if immediate maintenance of the turbine was necessary. This exact information when to cease operations to prevent permanent damage could be ascertained with more certainty after longer term evaluation of test data over a period of months or even years of a fleet of turbines with proper flame presence monitoring. This long-term maintenance evaluation would not be possible without the data acquired from the flame sensor(s).

The testing for normal service should ideally be performed from the first start of the turbine after entry into service when the fuel nozzles are known to be in a clean condition. This initial data can be set as a baseline for storage in the E.O.M. to indicate the ideal condition of the turbine. Subsequent data from continued operation of the turbine can then be compared to the initial baseline to produce a trend line to indicate to the operator the anticipated time for service for the individual turbine assuming a linear progression of clogging and if an unexpected change in the condition of the fuel nozzle occurs as discussed above an alarm or indication to the operator that immediate service is needed to prevent damage to the hot sections of the turbine.

Figure 9:
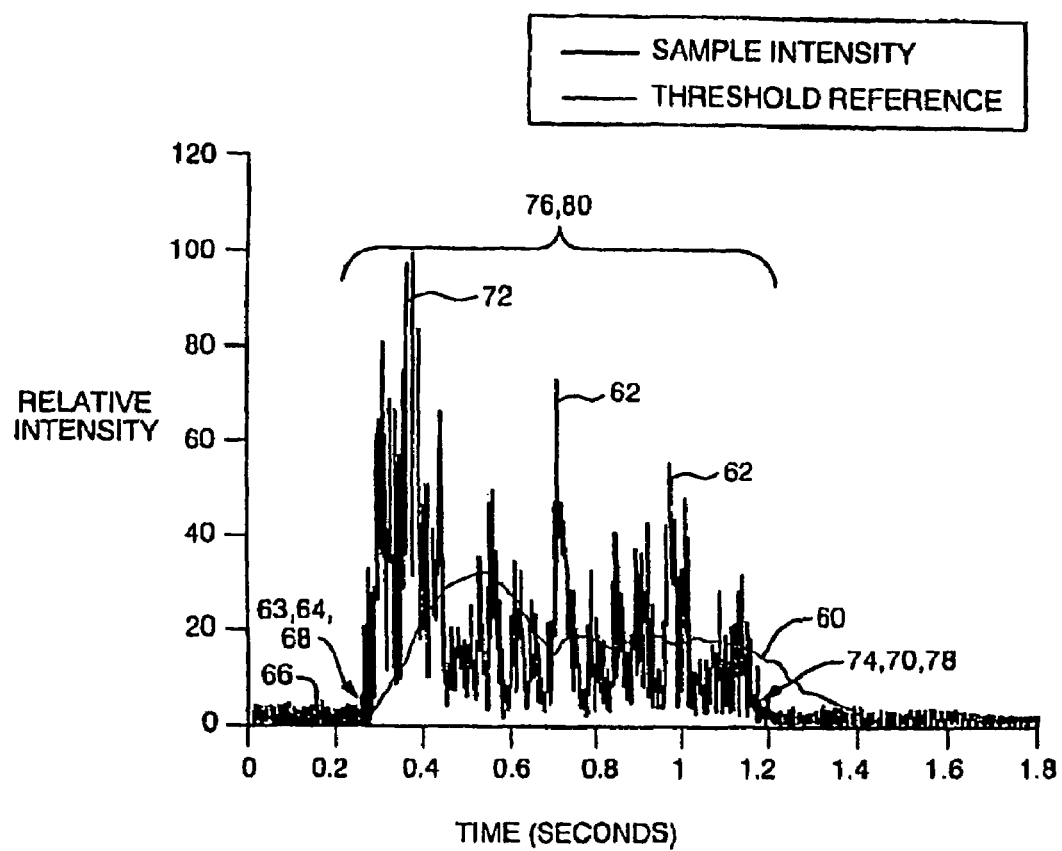
FIG. 9 is a pictorial representation of a flash event analysis as performed by the detection algorithm.

The following is an explanation for the graph of FIG. 9, which describes the methodology for determining the nature of a flash event: The threshold reference level 60 is a smoothing function of the sample intensity 62. It will be used to establish the trip point 64 for starting to integrate the flash interval 76. Once the relative intensity 66 reaches the trip point level 68, the reference threshold 62 is frozen and the starting point 63 is signaled. Then the relative intensity 66 is integrated and the time duration 76 along with the maximum peak 72 is tracked until the relative intensity 66 goes below the trip point level 74. This will signal the ending point 78 at which time the threshold reference 60 will be released to be readied for the next flash interval 80.

The specific equations below are preferably used and are optionally preformed by a microprocessor are as follows:

Used for establishing the threshold level.
Where α=running average interval
 n=discrete sample number
 NT=noise threshold $$T_i = \frac{1}{\alpha} \sum_{n=i+1}^{\alpha+i} \sqrt{X_n^2} + NT \Big|_{i=0}^{\infty}$$

Used for retrieving the sample intensity value.
Where α=running average interval
 n=discrete sample number $$SI_i = \frac{1}{\alpha} \sum_{n=i+1}^{\alpha+i} \sqrt{X_n^2} \Big|_{i=0}^{\infty}$$

Used to establish the beginning point of the flash interval. At this point in time the threshold level would be frozen until the sample intensity value gets below the threshold level.

$$B = SI_i > T_i \big|_{i=0}^{\infty}$$

Used to establish the ending point of the flash interval.

$$E = SI_i < T_{frozen} \big|_{i=0}^{\infty}$$

Used to establish the total integrated intensity value.

$$I = \sum_{B}^{E} SI_i - T_{frozen} \Big|_{i=0}^{\infty}$$

Used to establish the total time captured for the flash interval $$C = \sum_{B}^{E} i \Big|_{i=0}^{\infty}$$

Used to establish the peak intensity value.

$$P = SI_i \max \big|_{i=0}^{\infty}$$

It will be appreciated that the examples provided in the instant specification and claims are set forth by way of illustration and do not depart from the spirit and scope of the instant invention. It is to be understood that the instant invention is by no means limited to the particular embodiments herein disclosed but is much broader, it also comprises any modifications or equivalents within the scope of the claims.

Having thus described my invention, what I claim as new and desired to secure by United States Letters Patent is:

1. An apparatus for detecting the presence of flame in the exhaust path of a gas turbine engine comprising:

an optical viewing port mounted to a gas turbine engine exhaust section to collect radiant energy present in the exhaust path;

a sensor element comprising at least one spectrometer having a diffraction grating for refracting the radiant energy into different wavelengths and further having a detector array comprising a plurality of detectors, each detector sensitive to specific wavelengths of the refracted radiant energy produced from flame transmitted from said optical viewing port, wherein said sensor element emits an electrical signal when radiant energy is present; and, a microprocessor, for receiving and interpreting the electrical signal in comparison to predefined parameters, connected to said sensor element and activated when flame has been detected in the exhaust path of the gas turbine causing the electrical signal, wherein the microprocessor produces an output relative to the electrical signal.

2. The apparatus for detecting the presence of flame in the exhaust path of a gas turbine engine of claim 1 further comprising:

a fiber optic cable assembly mounted to receive the radiant energy from the optical viewing port and to transmit the radiant energy to the sensor element.

3. The apparatus for detecting the presence of flame in the exhaust path of a gas turbine engine of claim 1 further comprising:

a computer to receive the microprocessor output and make a determination of the state of the fuel nozzle clog.

4. The apparatus for detecting the presence of flame in the exhaust path of a gas turbine engine of claim 1 further comprising:

a storage device capable of saving said electrical signal from said sensor element for later analysis.

5. The apparatus for detecting the presence of flame in the exhaust path of a gas turbine engine of claim 1 further comprising:

a fiber optic cable assembly mounted to receive the radiant energy from said optical viewing port;

a collection optics to receive the radiant energy from said fiber optic cable and efficiently couple the radiant energy to said sensor element.

6. A method of determining the state of the fuel nozzle of a gas turbine comprising the steps of:

receiving radiant energy from the exhaust path of a gas turbine;

transferring the radiant energy to at least one sensor capable of detecting radiant energy;

determining an average of a baseline intensity of a normal background intensity of the radiant energy of a gas turbine known to be operating efficiently with clean fuel nozzles;

producing an electrical signal from the at least one sensor relative to the radiant energy;

comparing the electrical signal to the average of the baseline intensity;

indicating when radiant energy having an intensity greater than the baseline intensity has been received from the exhaust path.

7. The method of determining the state of the fuel nozzle of a gas turbine of claim 6, further comprising the step of amplifying the radiant energy from the exhaust path of the gas turbine.

8. The method of determining the state of the fuel nozzle of a gas turbine of claim 6, further comprising the step of filtering the radiant energy to a wavelength of about 200 to about 800 nm.

9. A method of determining the state of the fuel nozzle of a gas turbine, comprising the steps of:

receiving radiant energy from the exhaust path of a gas turbine;

transferring the radiant energy to at least one sensor capable of detecting radiant energy produced from a flame present in the exhaust;

determining the average of the baseline intensity of the normal background intensity of the radiant energy of a gas turbine known to be operating efficiently with clean fuel nozzles;

producing a signal from the at least one sensors when the radiant energy in the 200 nm to 800 nm range has been received from the exhaust path;

comparing the signal of the sensor to the average of the known baseline intensity; and signaling the presence of flame when the signal produced has a relative intensity greater than that of the average baseline intensity.

10. The method of determining the state of the fuel nozzle of a gas turbine of claim 9, further comprising the steps of storing the baseline intensity and signal produced from a sensor that indicated the presence of a flame in the exhaust.

11. The method of determining the state of the fuel nozzle of a gas turbine of claim 9, further comprising the steps of:

measuring the duration of time that the relative intensity of the signal produced is greater than the baseline intensity; and indicating to the operator of the gas turbine if the duration of time exceeds 30 ms.

12. The method of determining the state of the fuel nozzle of a gas turbine of claim 9, further comprising the steps of:

measuring the intensity of the signal produced from the sensor; and, indicating to the operator of the gas turbine if the sensor output reaches a level greater than the average relative intensity of the baseline intensity by a predetermined amount based on the level of turbine activity.

13. A method of detecting the presence of flame in the exhaust of a turbine engine, comprising the steps of:

gathering a light energy by a view port attached to the exhaust plenum of a turbine engine;

transmitting said light energy by a fiber optic cable into a spectrometer through a fixed aperture;

striking light energy against a collimating mirror in the spectrometer;

directing said light energy from the collimating mirror at a diffraction grating;

refracting the light energy into wavelengths by the grating;

directing the refracted light toward a focusing mirror;

reflecting the refracted light to strike onto a focusing mirror;

focusing the refracted light onto a detector array comprising a plurality of detectors;

concentrating the refracted light in front of the detector array with a lens onto an individual detector;

responding to an individual wavelength of light that strikes a detector element (pixel) with an electrical signal;

feeding said signal into a microprocessor;

interpreting a signal strength and information relative to the intensity of the individual wavelengths of light as received by said detector array, and providing information to an end user of the gas turbine.

14. The method of claim 13, further comprising the step of limiting the effects of second and third order wavelength harmonics using an order sorting filter.

15. The method of claim 13, further comprising the step of determining the spectral nature of the flame condition being monitored.

16. A method of determining the presence of flame in the exhaust of a gas turbine, comprising the steps of:

collecting spectral energy from the exhaust portion of a gas turbine;

transmitting said spectral energy to a sensor;

producing an electrical signal corresponding to the intensity and presence of a flame in the exhaust;

storing the electrical signal in a storage device;

providing a computer processor to evaluate the electrical signal; and performing with the computer processor operations, further comprising the steps of:

establishing a threshold level $$T_i = \frac{1}{\alpha} \sum_{n=i+1}^{\alpha+i} \sqrt{X_n^2} + NT \bigg|_{i=0}^{\infty}$$

wherein $\alpha$=running average interval, n=discrete sample number, NT=noise threshold;

determining a sample intensity value $$SI_i = \frac{1}{\alpha} \sum_{n=i+1}^{\alpha+i} \sqrt{X_n^2} \bigg|_{i=0}^{\infty}$$

wherein $\alpha$=running average interval, n=discrete sample number; freezing the threshold level until the sample intensity value gets below the threshold level;

establishing an ending point of the flash interval $$B = SI_i > T_i \big|_{i=0}^{\infty};$$

establishing a total integrated intensity value $$E = SI_i < T_{frozen} \big|_{i=0}^{\infty};$$

establishing a total time captured for the flash interval $$I = \sum_{B}^{E} SI_i - T_{frozen} \bigg|_{i=0}^{\infty}$$

$$C = \sum_{B}^{E} i \bigg|_{i=0}^{\infty} ; \text{ and}$$

establishing a peak intensity value $$P = SI_i \max \big|_{i=0}^{\infty};$$

wherein the results of operations $T_1$, $SI_1$, B, E, I, C and P produced are stored in a memory device.

17. The method of determining presence of flame in the exhaust of a gas turbine of claim 16, further comprising the steps of:

comparing the stored results of operations $T_1$, $SI_1$, B, E, I, C and P; and determining that a condition requiring maintenance of the nozzles exists.

18. The method of determining presence of flame in the exhaust of a gas turbine of claim 17, further comprising the step of indicating that a condition requiring maintenance of the turbine exists.

* * * * *